(12) United States Patent
Watanabe et al.

(10) Patent No.: US 9,004,030 B2
(45) Date of Patent: *Apr. 14, 2015

(54) VARIABLE VALVE ACTUATING APPARATUS FOR INTERNAL COMBUSTION ENGINE

(71) Applicant: Hitachi Automotive Systems, Ltd., Hitachinaka-shi, Ibaraki (JP)

(72) Inventors: Atsushi Watanabe, Atsugi (JP); Tetsuya Shibukawa, Atsugi (JP); Yasuhide Takada, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,715

(22) Filed: Apr. 22, 2013

(65) Prior Publication Data

US 2013/0333647 A1 Dec. 19, 2013

(30) Foreign Application Priority Data

Jun. 13, 2012 (JP) ................................ 2012-133344
Jun. 13, 2012 (JP) ................................ 2012-133345

(51) Int. Cl.
*F01L 1/34* (2006.01)
*F02D 13/00* (2006.01)

(52) U.S. Cl.
CPC . *F02D 13/00* (2013.01); *Y02T 10/18* (2013.01)

(58) Field of Classification Search
USPC .............................. 123/90.15, 90.17; 464/160
See application file for complete search history.

(56) References Cited

U.S. PATENT DOCUMENTS

| 7,938,090 | B2 | 5/2011 | Lancefield et al. |
| 8,205,587 | B2 | 6/2012 | Murata |
| 2010/0212617 | A1 | 8/2010 | Murata |

FOREIGN PATENT DOCUMENTS

JP 2010-196486 A 9/2010

OTHER PUBLICATIONS

U.S. Appl. No. 13/867,708, filed Apr. 22, 2013, Hitachi Automotive Systems, Ltd.
A. Watanabe, U.S. PTO Official Action, U.S. Appl. No. 13/867,708, dated Jul. 24, 2014, 9 pages.
A. Watanabe, U.S. PTO Notice of Allowance, U.S. Appl. No. 13/867,708, dated Dec. 5, 2014, 7 pages.

*Primary Examiner* — Ching Chang
(74) *Attorney, Agent, or Firm* — Foley & Lardner LLP

(57) ABSTRACT

A variable valve actuating apparatus includes: a first lock recessed portion; a first lock member; a second lock recessed portion formed in the second rotary member's side; a second lock member; a first lock passage arranged to supply the hydraulic fluid, and thereby to move the first lock member out of the first lock recessed portion; and a second lock passage arranged to supply the hydraulic fluid, and thereby to move the second lock member out of the second lock recessed portion, at least a part of the first lock recessed portion and at least a part of the second lock recessed portion being disposed at a position to be projected in an axial direction when the first lock member and the second lock member are in the lock state.

18 Claims, 16 Drawing Sheets

VARIABLE VALVE ACTUATING APPARATUS FOR INTERNAL COMBUSTION ENGINE

BACKGROUND OF THE INVENTION

This invention relates to a variable valve actuating apparatus for an internal combustion engine which is configured to variably control an operation characteristic of an engine valve which is an intake valve and/or an exhaust valve of the internal combustion engine.

U.S. Patent Application Publication No. 2010/212617 A1 (corresponding to Japanese Patent Application Publication No. 2010-196486) discloses a conventional variable valve actuating apparatus.

The above-described variable valve actuating apparatus includes two intake valves in each cylinder; an inner cam shaft integrally provided with an inner cam provided on an outer circumference of the inner cam shaft, and arranged to drive one of the intake valves; and an outer cam shaft disposed on an outer circumference of the inner cam shaft to be relatively rotated (relative to the inner cam shaft), and integrally provided with an outer cam provided on an outer circumference of the outer cam shaft, and arranged to drive the other of the intake valves. At an end portion of the inner cam shaft and an end portion of the outer cam shaft, there are integrally provided, respectively, two vane-type hydraulic actuators which are arranged in series (with each other) in an axial direction.

The two hydraulic actuators are arranged to relatively rotate the inner cam shaft and the outer cam shaft by the supplied hydraulic pressure, and thereby to control the operation angle of the intake valve. Moreover, the two hydraulic pressure actuators are arranged to relatively rotate the inner cam shaft and the outer cam shaft relative to (with respect to) the crank shaft, and thereby to control opening/closing timing of each intake valve.

SUMMARY OF THE INVENTION

However, in the conventional variable valve actuating apparatus, the two hydraulic actuators are integrally provided at the end portions of the inner cam shaft and the outer cam shaft, and arranged in series (with each other) in the axial direction. Accordingly, an axial length of the apparatus becomes long, so that a size of the apparatus becomes larger.

It is, therefore, an object of the present invention to provide a variable valve actuating apparatus which is arranged to control a relative rotational phase of an inner cam shaft and an outer cam shaft, and to control relative rotational phases of both cam shafts with respect to the cranks shaft, and whose size is decreased.

According to one aspect of the present invention, a variable valve actuating apparatus for an internal combustion engine, the variable valve actuating apparatus comprises: an inner cam shaft including an inner cam formed on an outer circumference thereof; an outer cam shaft which is provided on the outer circumference of the inner cam shaft, which includes an outer cam provided radially outside the outer cam shaft, the outer cam shaft and the inner cam shaft being arranged to be relatively rotated so as to vary a relative rotational phase of the outer cam with respect to the inner cam; a drive rotary member to which a rotational force is transmitted from a crank shaft, and which includes an operation chamber formed within the drive rotary member; a first rotary member which includes a rotor fixed to one of the inner cam shaft and the outer cam shaft, vanes separating the operation chamber to an advance angle operation chamber and a retard angle operation chamber, and a receiving chamber formed within the first rotary member, and which is arranged to be rotated in an advance angle direction or in a retard angle direction relative to the drive rotary member by a hydraulic pressure selectively supplied to or drained from the advance angle operation chamber and the retard angle operation chamber; and a second rotary member fixed to the other of the inner cam shaft and the outer cam shaft, rotatably received within the receiving chamber of the first rotary member, and arranged to be rotated relative to the first rotary member and the drive rotary member within a predetermined angle range; a first lock recessed portion formed on a sliding surface of the drive rotary member on which an axial end surface of the second rotary member is slid; a first lock member which is arranged to be moved in a direction of a rotation axis of the second rotary member, and which is arranged to be moved into and engaged with the first lock recessed portion, and thereby to lock the relative rotation between the drive rotary member and the second rotary member, and which is arranged to be moved out of the first lock recessed portion, and thereby to release the lock between the drive rotary member and the second rotary member; a second lock recessed portion formed in the second rotary member's side; a second lock member provided to the first rotary member to be moved in an axial direction, and arranged to be moved into and engaged with the second lock recessed portion to lock the relative rotation between the first rotary member and the second rotary member, and to be moved out of the second recessed portion to release the lock between the first rotary member and the second rotary member; a first lock passage arranged to supply the hydraulic fluid, and thereby to move the first lock member out of the first lock recessed portion; and a second lock passage arranged to supply the hydraulic fluid, and thereby to move the second lock member out of the second lock recessed portion, at least a part of the first lock recessed portion and at least a part of the second lock recessed portion being disposed at a position to be projected in an axial direction when the first lock member and the second lock member are in the lock state.

According to another aspect of the invention, a variable valve actuating apparatus for an internal combustion engine, the variable valve actuating apparatus comprises: an inner cam shaft including an inner cam formed on an outer circumference thereof; an outer cam shaft which is provided on the outer circumference of the inner cam shaft, which includes an outer cam provided radially outside the outer cam shaft, the outer cam shaft and the inner cam shaft being arranged to be relatively rotated so as to vary a relative rotational phase of the outer cam with respect to the inner cam; a drive rotary member to which a rotational force is transmitted from a crank shaft; a first rotary member which is fixed to one of the inner cam shaft and the outer cam shaft, which is arranged to be rotated in an advance angle direction or in a retard angle direction relative to the drive rotary member by a hydraulic pressure, and which includes a receiving chamber formed within the first rotary member; a second rotary member fixed to the other of the inner cam shaft and the outer cam shaft, rotatably received within the receiving chamber of the first rotary member, and arranged to be rotated relative to the first rotary member and the drive rotary member within a predetermined angle range; a first lock recessed portion formed on a sliding surface of the drive rotary member on which an axial end surface of the second rotary member is slid; a first lock member which is arranged to be moved in a direction of a rotation axis of the second rotary member, and which is arranged to be moved into and engaged with the first lock recessed portion, and thereby to lock the relative rotation between the drive rotary member and the second rotary member, and which is arranged to be moved out of the first lock recessed portion, and thereby to release the lock between the drive rotary member and the second rotary member; a second lock recessed portion formed in the second rotary member's side; a second lock member provided to the first rotary member to be moved in an axial direction, and arranged to be moved into and engaged with the second lock recessed portion to lock the relative rotation between the first rotary member and the second rotary member, and to be moved out of the second recessed portion to release the lock between the first rotary member and the second rotary member; a first lock passage arranged to supply the hydraulic fluid, and thereby to move the first lock member out of the first lock recessed portion; and a second lock passage arranged to supply the hydraulic fluid, and thereby to move the second lock member out of the second lock recessed portion, at least a part of the first lock recessed portion and at least a part of the second lock recessed portion being disposed at a position to be projected in an axial direction when the first lock member and the second lock member are in the lock state.

According to still another aspect of the invention, a variable valve actuating apparatus for an internal combustion engine, the variable valve actuating apparatus comprises: an inner cam shaft including an inner cam formed on an outer circumference thereof; an outer cam shaft which is provided on the outer circumference of the inner cam shaft, which includes an outer cam provided radially outside the outer cam shaft, the outer cam shaft and the inner cam shaft being arranged to be relatively rotated so as to vary a relative rotational phase of the outer cam with respect to the inner cam; a drive rotary member to which a rotational force is transmitted from a crank shaft, and which includes an operation chamber formed within the drive rotary member; a first rotary member which includes a rotor fixed to one of the inner cam shaft and the outer cam shaft, vanes separating the operation chamber to an advance angle operation chamber and a retard angle operation chamber, and a receiving chamber formed within the first rotary member, and which is arranged to be rotated in an advance angle direction or in a retard angle direction relative to the drive rotary member by a hydraulic pressure selectively supplied to or drained from the advance angle operation chamber and the retard angle operation chamber; and a second rotary member fixed to the other of the inner cam shaft and the outer cam shaft, rotatably received within the receiving chamber of the first rotary member, and arranged to be rotated relative to the first rotary member and the drive rotary member within a predetermined angle range; a first lock mechanism provided to the first rotary member, and arranged to lock a relative rotation between the first rotary member and the second rotary member, and to release the lock of the relative rotation between the first rotary member and the second rotary member; and a second lock mechanism provided to the second rotary member, and arranged to lock a relative rotation between the drive rotary member and the second rotary member in accordance with a request, and to release the lock of the relative rotation between the drive rotary member and the second rotary member in accordance with the request.

DETAILED DESCRIPTION OF THE INVENTION

Hereinafter, variable valve actuating apparatuses for an internal combustion engine according to embodiments of the present invention are illustrated with reference to the drawings. In these embodiments, the variable valve actuating apparatus is applied to an exhaust valve side of, for example, a four cylinder gasoline internal combustion engine.

First Embodiment

The internal combustion engine includes two exhaust valves at each one cylinder. The variable valve actuating apparatus is arranged to variably control an opening and closing timing and an operation angle (opening angle) of both exhaust valves in accordance with a driving state of the engine.

That is, as shown in FIG. 1-FIG. 5, the variable valve actuating apparatus includes a sprocket 1 arranged to be driven and rotated through a timing chain by a crank shaft (not shown) of the engine; a cam shaft 2 on the exhaust side which is provided to be rotated relative to sprocket 1; a phase varying mechanism 3 disposed between sprocket 1 and cam shaft 2, and arranged to shift a relative rotational phase of sprocket 1 and cam shaft 2; and a hydraulic pressure circuit 4 which is arranged to actuate phase varying mechanism 3.

The two exhaust valves of each cylinder includes an umbrella (bonnet) portion arranged to open and close an opening end of each of the two exhaust portions on the cylinder's side. Each of the two exhaust valves is arranged to be urged in a closing direction by a spring force of a valve spring through a valve lifter disposed at an upper end portion of each exhaust valve.

Figure 1:
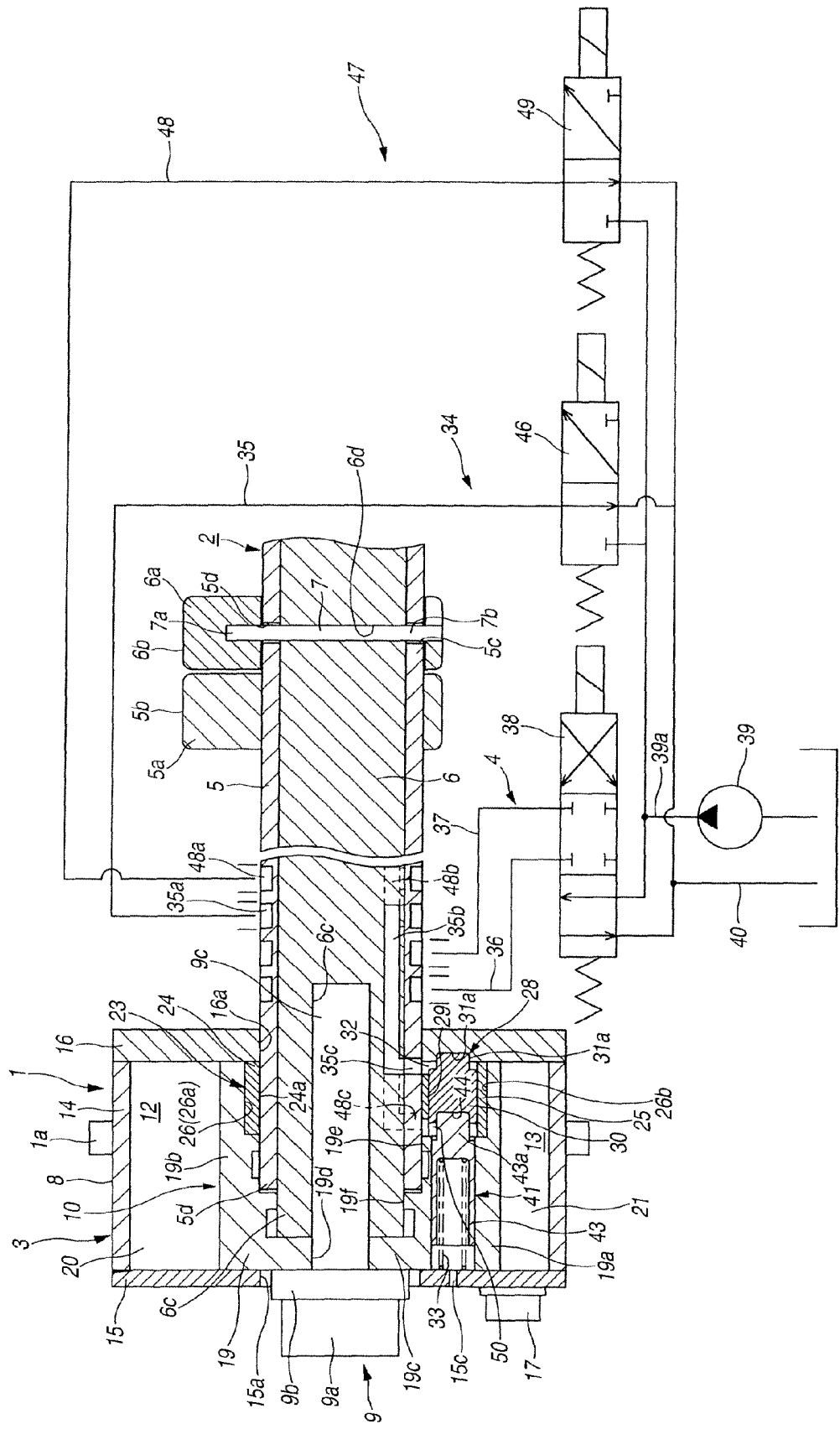
FIG. 1 is a longitudinal sectional view showing a variable valve actuating apparatus according to a first embodiment of the present invention.

As shown in FIG. 1 and FIG. 2, cam shaft 2 includes an outer cam shaft 5 having a hollow inside portion; and an inner cam shaft 6 which has a solid inside portion, and which is provided within outer cam shaft 5 to be rotated relative to outer cam shaft 5. Inner cam shaft 6 is rotatably supported on an inner circumference surface of outer cam shaft. On the other hand, outer cam shaft 5 is rotatably supported by a cylinder head (not shown) through a cam bearing.

Outer cam shaft 5 is integrally provided with a first drive cam 5a on an outer circumference surface of outer cam shaft 5 at a predetermined position by the press fit. First drive cam 5a is arranged to open one of the exhaust valve of each cylinder through the valve lifter.

Inner cam shaft 6 includes an internal screw hole 6c formed within a tip end portion 6b of inner cam shaft 6 in the axial direction, and into which an external screw of the outer circumference of a shaft portion 9c of a cam bolt 9 is screwed.

Moreover, a second drive cam 6a is fixed at a predetermined position of inner cam shaft 6 in the axial direction. Second drive cam 6a is arranged to open the one of the exhaust valves through the same valve lifer while sliding on the outer circumference of outer cam shaft 5.

Inner cam shaft 6 includes a through hole 6d which is formed to extend in the diameter direction. A connection shaft 7 penetrates through through hole 6d of inner cam shaft 6, and fixed to through hole 6d of inner cam shaft 6. Moreover, both end portions 7a and 7b of connection shaft 7 are fixed in the inside portions of second drive cam 6a by the press fit. With this, second drive cam 6a is fixed to inner cam shaft 6. Moreover, connection shaft 7 penetrates through a pair of insertion holes 5c and 5d formed in outer cam shaft 5 to penetrate through outer cam shaft 5f in the diameter direction. Each of insertion holes 5c and 5d is formed into a slit shape extending in a circumferential direction, so as to allow inner cam shaft 6 to rotate relative to outer cam shaft 5 within a predetermined angle range, through connection shaft 7.

Figure 2A:
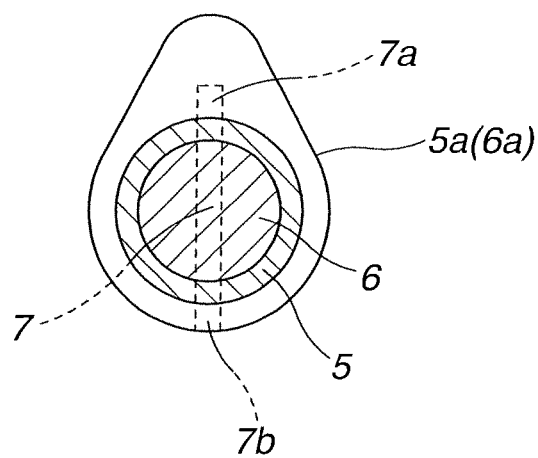
FIGS. 2A and 2B are views showing two drive cams in the variable valve actuating apparatus of FIG. 1.
Figure 2B:
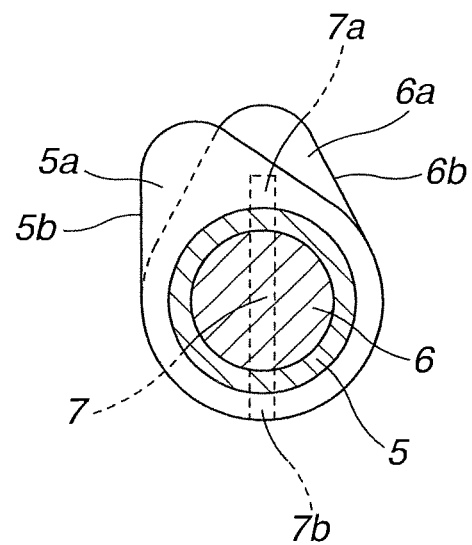

As shown in FIG. 1 and FIGS. 2A and 2B, first drive cam 5a and second drive cam 6a are disposed adjacent to each other through a minute gap between first drive cam 5a and second drive cam 6a. Moreover, first drive cam 5a and second drive cam 6a include outer circumference surfaces 5b and 6b having the same oval cam profile. First drive cam 5a and second drive cam 6a are arranged to independently open and close the one of the exhaust valves of the one cylinder.

As shown in FIG. 1, and FIG. 3-FIG. 5, phase varying mechanism 3 includes a housing 8 which is disposed at one end portion of cam shaft 2, and which is integrally formed with sprocket 1; and a first vane rotor 10 which is a first rotary member that is fixed at the one end portion of outer cam shaft 5 by cam bolt 9 from the axial direction, and that is rotatably received within housing 8; three first to third shoes 11a-11c protruding from an inner circumference surface of housing 8; three retard fluid pressure chambers 12 which are retard angle operation chambers that are separated by three shoes 11a-11c and three first to third vanes 20-22 of first vane rotor 10 described later; and advance fluid pressure chambers 13 which are advance angle operation chambers that are separated by three first to third shoes 11a-11c and three first to third vanes 20-22.

Housing 8 includes a cylindrical housing main body 14 which has openings at both axial ends, and which is used together with sprocket 1; and a front plate 15 and a rear plate 16 which closes the front and rear axial openings of housing main body 14. Front plate 15 and rear plate 16 are integrally connected together with housing main body 14 by screwing together from the axial direction by three bolts 17.

Housing main body 14 is formed from a sintered metal into a cylindrical integral body. Housing main body 14 includes a toothed portion is which is integrally formed on an outer circumference of a front end of housing main body 14, and around which a chain is wound; and three first to third shoes 11a-11c which are integrally formed on an inner circumference, and which protrude in the inward direction.

Each of shoes 11a-11c has a substantially trapezoid shape as viewed in the side direction. Two of the shoes 11a-11c (shoes 11b and 11c) are disposed at an interval of 180 degrees in the circumferential direction of housing main body 14. One of shoes 11a-11c (shoe 11a) is disposed between the two of shoes 11a-11c. Each of shoes 11a-11c includes a seal groove formed at a tip end portion of the each of shoes 11a-11c in the axial direction. A seal member 18 which is substantially U-shape is mounted and fixed in each of the seal grooves of shoes 11a-11c.

Moreover, each of shoes 11a-11c includes a bolt insertion hole 11d which is formed at a radially outer side portion (outer circumference portion) of each of shoes 11a-11c, and which penetrates through the each of shoes 11a-11c. Each of bolts 17 is inserted into one of the bolt insertion holes 11d.

Figure 5:
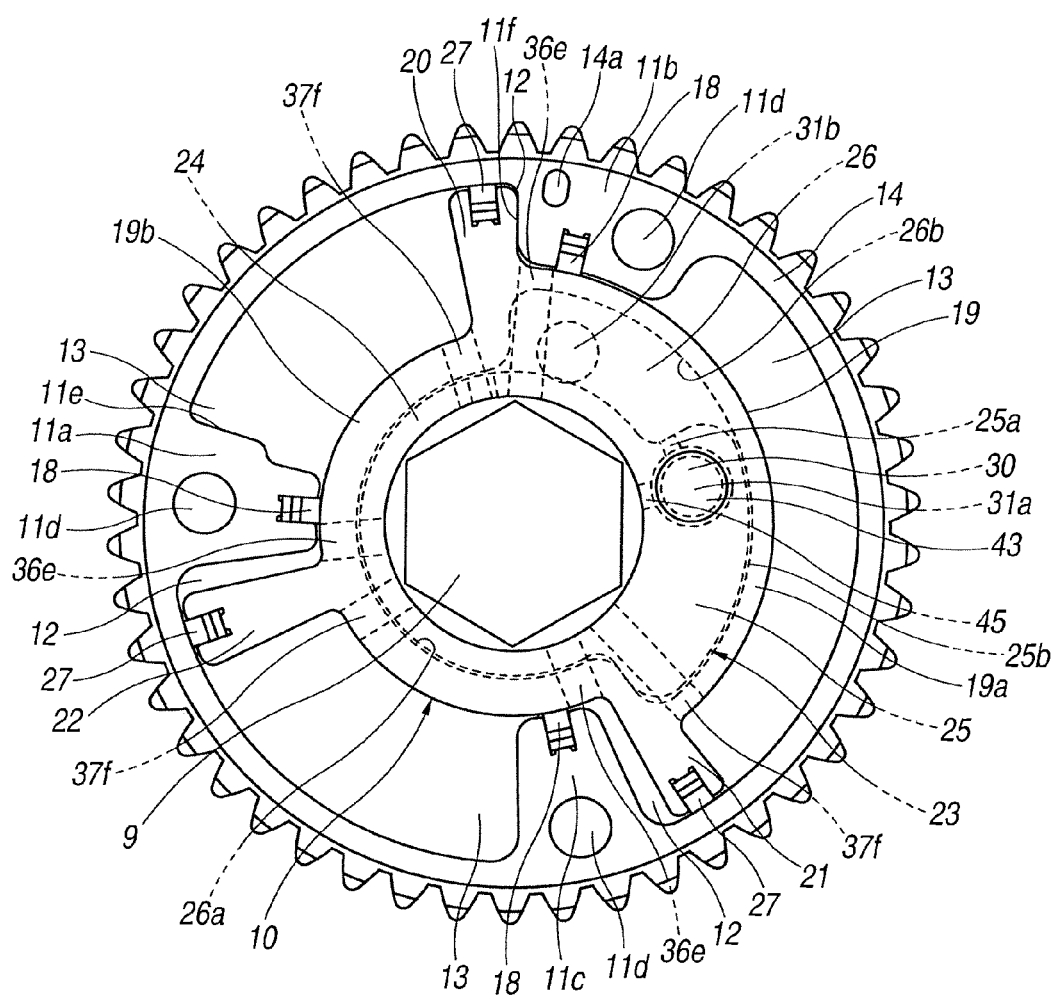
FIG. 5 is an operation illustrative view showing a state in which relative rotational phases of a first vane rotor and a second vane rotor with respect to a sprocket are shifted to a most advance angle side.
Figure 6:
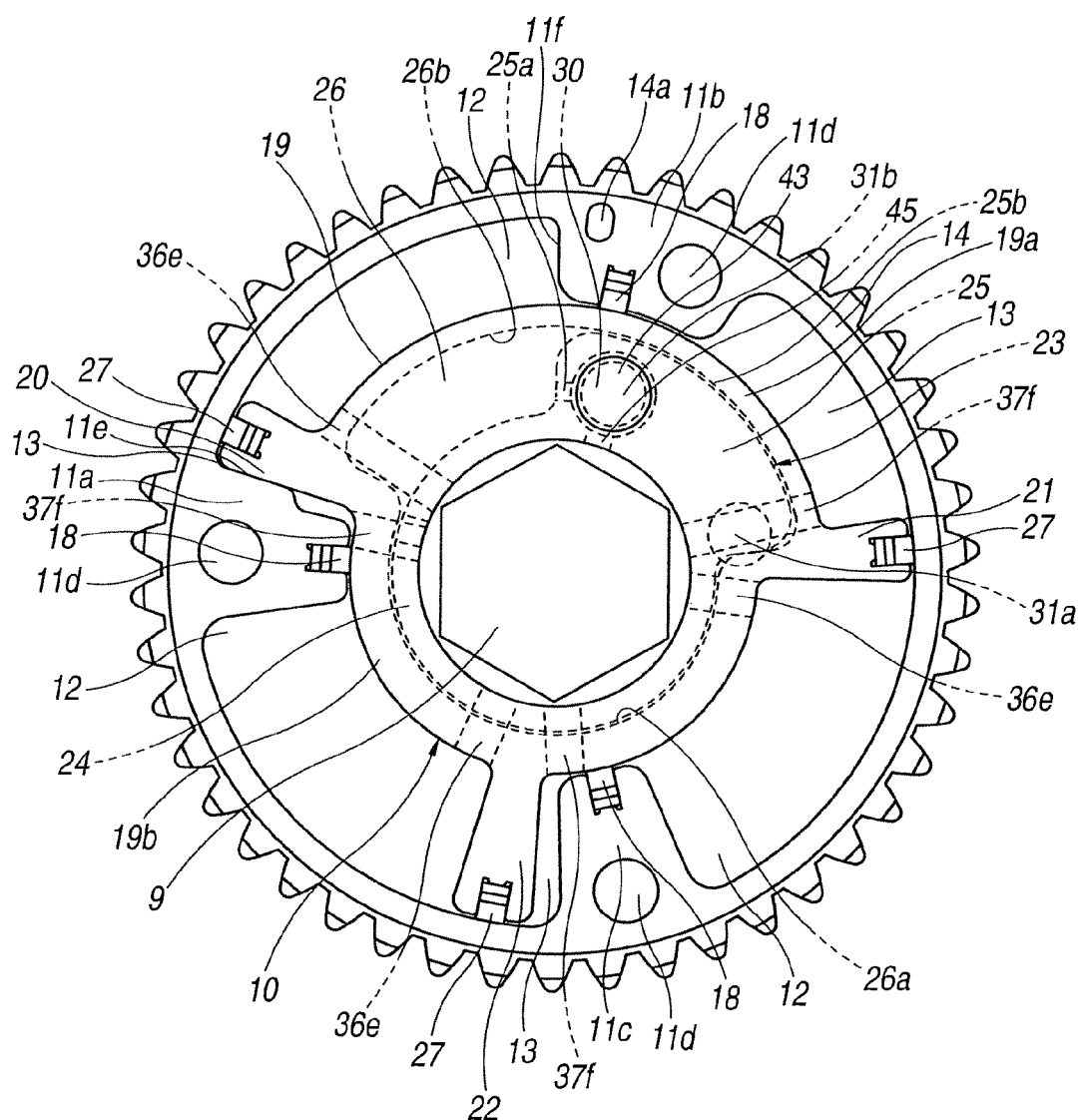
FIG. 6 is an operation illustrative view showing a state in which the relative rotational phases of the first vane rotor and the second vane rotor with respect to the sprocket are shifted to a most retard angle side.

First shoe 11a includes a flat first raised surface 11a which is formed on one circumferential side surface in the circumferential direction. On the other hand, second shoe 11b includes a flat second raised surface 11f which is formed on one circumferential side surface confronting the one circumferential side surface of first shoes 11a in the circumferential direction. When first vane rotor 20 described later is rotated in a clockwise direction and in a counterclockwise direction as shown in FIG. 5 and FIG. 6, the corresponding surfaces of first vane 20 (which confront raised surfaces 11e and 11f) are abutted on these raised surfaces 11e and 11f so as to restrict first vane rotor 10 at a most retard position and most advance angle position.

Front plate 15 is formed by press-forming a metal sheet, into a circular disc plate having a relatively small thickness. Front plate 15 includes a large diameter hole 15a which is formed at a central portion of front plate 15, and in which a flange-shaped seat portion 9b of a head portion 9a of cam bolt 9 is disposed and received; and three bolt insertion holes 15b which are formed on an outer circumference side at a regular interval in the circumferential direction, which penetrate through front plate 15, and each of which one of bolts 17 is inserted through. Moreover, this front plate 15 includes two breath holes 15c and 15d each of which has a small diameter, each of which penetrates through front plate 15, which are formed on an inner circumference portion of front plate 15.

These breath holes 15c and 15d are arranged to connect the outside air and a second sliding hole 42 of a second lock mechanism 41 described later when first vane rotor 10 is positioned at the relative rotational positions on the most advance angle side and on the most retard angle side, so as to ensure the good slidability of a second lock pin 43.

Rear plate 16 is formed from the sintered alloy into a circular disc shape having a thickness larger than the thickness of front plate 15. Rear plate 16 includes a support hole 16a which is formed at a central portion of rear plate 16, which penetrates through rear plate 16, into which a cylindrical rear end portion of a first rotor 19 (described later) of a first vane rotor 10 is inserted, and which rotatably supports the cylindrical rear end portion of first rotor 19 of first vane rotor 10. Moreover, rear plate 16 includes three internal screw holes 16b formed on the outer circumference side of rear plate 16 at a regular interval in the circumferential direction, and into which the external screws of the tip end portions of bolts 17 are respectively screwed.

Rear plate 16 includes first lock holes 31a and 31b which are two first lock recessed portions of first lock mechanism 28 described later, and which are formed on the outer circumference portion of rear plate 16 at predetermined positions. These first lock holes 31a and 31b are formed at a predetermined interval on the same arc locus so that a first lock pin 30 which is the first lock member of first lock mechanism 28 is engaged with first lock holes 31a and 31b at relative rotational positions of the most advance angle position and the most retard angle position of first vane rotor 10, as described later.

Rear plate 16 includes a positioning pin 16c which is located on the outer circumference portion of rear plate 16 at a predetermined position, which protrudes, and which is inserted in and engaged with a positioning hole 14a formed in second shoe 11b of housing main body 14 so as to position rear plate 16 with respect to housing main body 14.

Figure 3:
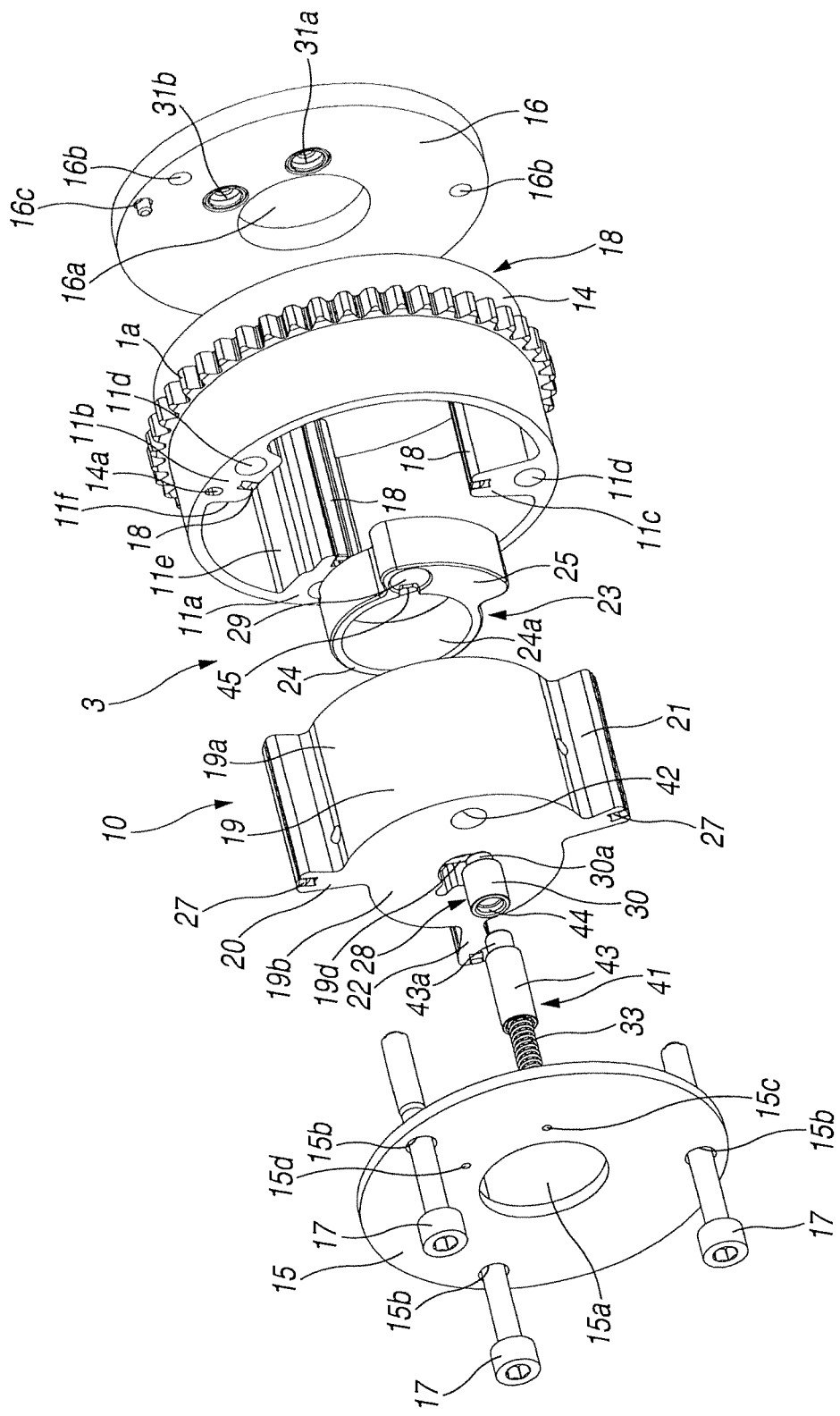
FIG. 3 is an exploded perspective view showing a main part of the variable valve actuating apparatus of FIG. 1.

First vane rotor 10 is integrally formed from, for example, the sintered metal. As shown in FIG. 1, FIG. 3, and FIG. 5, first vane rotor 10 includes a first rotor 19 on a central side; and three first to third vanes 20-22 which protrude from the outer circumference of first rotor 19 in the radial directions.

First rotor 19 has an overall shape which is formed into a substantially cylindrical hollow shape. First rotor 19 has a stepped shape having a large diameter portion 19a and a small diameter portion 19b which are arranged in the circumferential direction. Large diameter portion 19a of first rotor 19 has a large outside diameter.

Small diameter portion 19b of first rotor 19 has a small outside diameter smaller than the outside diameter of large diameter portion 19a of first rotor 19. First rotor 19 includes large diameter portion 19a between first vane 20 and second vane 21; and small diameter portion 19b between first vane 20 and third vane 22.

This first rotor 19 includes an insertion hole 19d which is formed at a central portion of a disc wall 19c formed at the front end portion of first rotor 19, into which shaft portion 9c of cam bolt 9 is inserted, and which penetrates through first rotor 19 in the axial direction; and first and second mounting holes 19e and 19f which are formed into stepped shapes. A tip end portion 5d of outer cam shaft 5 is mounted in first mounting hole 19e of first rotor 19. A tip end portion 6c of inner cam shaft 6 is mounted in second mounting hole 19f of first rotor 19. Moreover, this first rotor 19 is fixed at tip end portion 6c of inner cam shaft 6 by being tightened by cam bolt 9 through disc wall 19c from the axial direction.

In this first rotor 19, tip end portion 5d of outer cam shaft 5 is mounted in first mounting hole 19e. However, first rotor 19 is not connected with outer cam shaft 5 so as to allow the free rotation between outer cam shaft 5 and first rotor 19.

Moreover, first rotor 19 includes a receiving chamber 26 which is formed in an inside of first rotor 19 on a rear side of first mounting hole 19e in which outer cam shaft 5 is mounted, and which receives second vane rotor 23 to be relatively rotated. As shown in FIG. 5, this receiving chamber 26 includes a circular rotor receiving portion 26a formed at a central portion of first rotor 19; and a sectorial vane receiving portion 26b which is formed into a sectorial shape within large diameter portion 19a, and which is connected to rotor receiving portion 26a.

Large diameter portion 19a includes a second sliding hole 42 formed at a substantially central position in the circumferential direction, which penetrates in the axial direction, and in which second lock pin 43 that is a second lock member of second lock mechanism 41 is slid.

As shown in FIG. 5, first to third vanes 20 to 22 have a substantially same circumferential width. Each of first to third vanes 20 to 22 includes a mounting groove formed at a tip end portion of the each of first to third vanes 20 to 22. Seal members 27 are mounted and fixed, respectively, in the mounting grooves of first to third vanes 20 to 22. Seal members 27 are slidably abutted on an inner circumference surface of housing main body 14 so as to seal retard fluid pressure chambers and advance fluid pressure chambers 12 and 13.

Moreover, one circumferential side surface of first vane 20 on a counterclockwise side in the drawing (the advance fluid pressure chamber 13's side) is abutted on first raised surface 11e so as to restrict the maximum relative rotation when first vane 20 is relatively rotated on the retard angle side. Furthermore, the other circumferential side surface of first vane 20 on a clockwise side in the drawing (the retard fluid pressure chamber 12's side) is abutted on second raised surface 11f so as to restrict the maximum relative rotation when first vane 20 is relatively rotated on the advance angle side.

As shown in FIG. 1, FIG. 3, and FIG. 5, second vane rotor 23 received within receiving chamber 26 includes an annular second rotor 24 received and held within rotor receiving portion 26a of first rotor 19 to be relatively rotated; and a fourth vane 25 which is integrally formed on the outer circumference surface of second rotor 24, which protrudes from the outer circumference surface of second rotor 24, and which is pivotally received within vane receiving chamber 26b.

Second rotor 24 has an outside diameter slightly smaller than an inside diameter of rotor receiving portion 26a. Between the outer circumference surface of second rotor 24 and an inner circumference surface of rotor receiving portion 26a, there is formed a minute cylindrical clearance to ensure the free rotation of second rotor 24. Moreover, second rotor 24 has an axial length substantially identical to an axial length of rotor receiving portion 26a.

Moreover, as shown in FIG. 1, this second rotor 24 includes a circular fix hole 24a which is formed at a central portion of second rotor 24, and which penetrates in the axial direction. Tip end portion 5d of outer cam shaft 5 is fixed in this fix hole 24a of second rotor 24 by the press fit.

Fourth vane 25 has a sectorial shape corresponding to vane receiving portion 26b. Fourth vane 25 is received within vane receiving portion 26b to be relatively rotated. Moreover, between an outer circumference surface 25b of fourth vane 25 and an inner circumference surface of vane receiving portion 26b, there is formed a clearance.

Moreover, fourth vane 25 includes a first sliding hole 29 which is a second lock recessed hole, which is formed in fourth vane 25 on a counterclockwise side of the circumferential direction, that is, on the retard angle side, and which penetrates through fourth vane 25 in the axial direction. First lock pin 30 of first lock mechanism 28 is slid within this first sliding hole 29.

Figure 4:
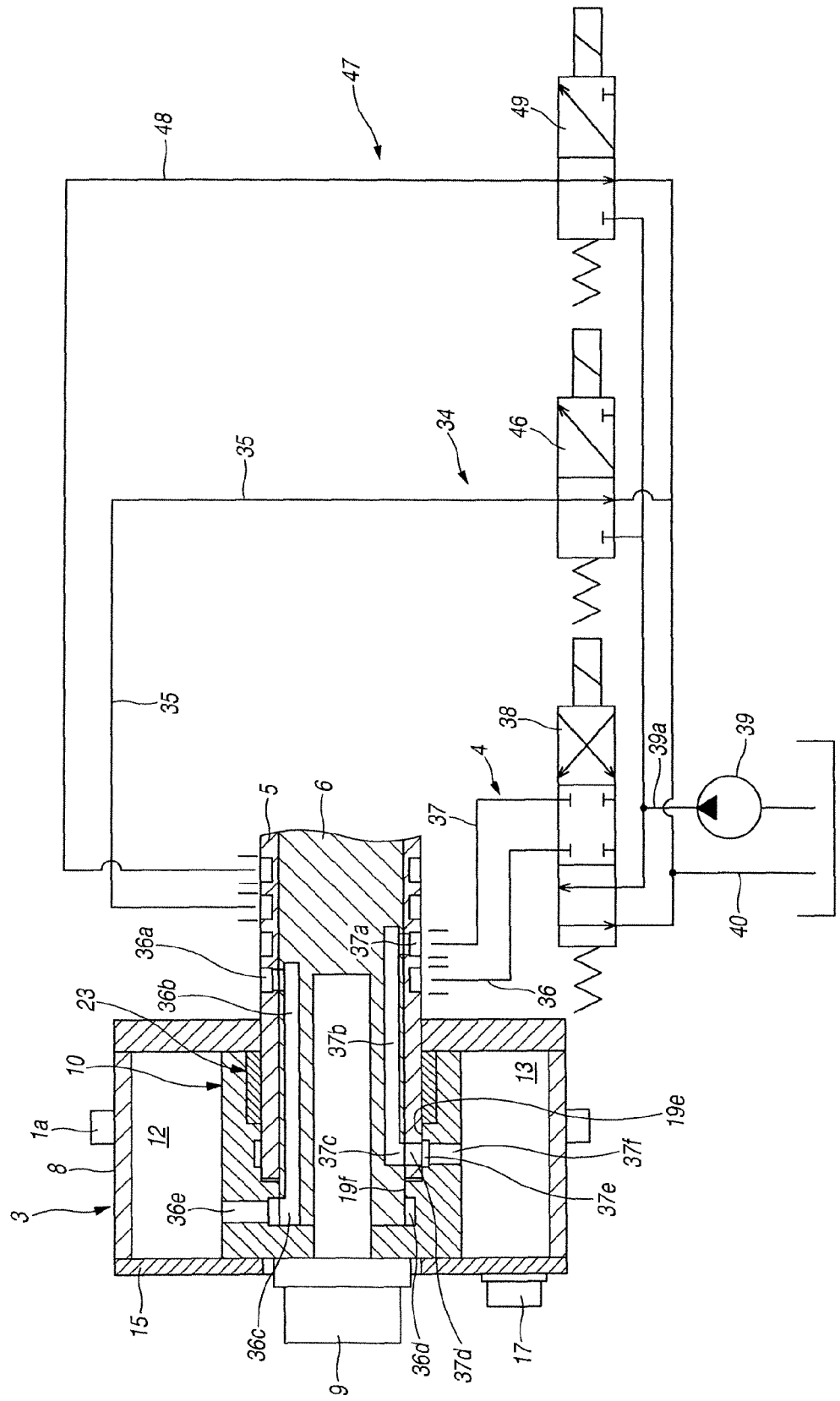
FIG. 4 is a longitudinal sectional view showing a hydraulic circuit of the variable valve actuating apparatus of FIG. 1.

Hydraulic pressure circuit 4 is arranged to supply the hydraulic pressure selectively to retard fluid pressure chambers 12 and advance fluid pressure chambers 13, and to drain (discharge) the hydraulic pressure selectively from retard fluid pressure chambers 12 and advance fluid pressure chambers 13. As shown in FIG. 1 and FIG. 4, hydraulic pressure circuit 4 includes a retard side passage 36 connected with retard fluid pressure chambers 12; an advance side passage 37 connected with advance fluid pressure chambers 13; an oil pump 39 arranged to supply the hydraulic pressure selectively to retard side passage 36 and advance side passage 37 thorough an electromagnetic switching valve (solenoid valve) 38; and a drain passage 40 connected selectively to retard side passage 36 and advance side passage 37 through electromagnetic switching valve 38.

As shown in FIG. 4, retard side passage 36 includes a groove 36a formed on an outer circumference surface of outer cam shaft 5; a radial hole and an axial hole 36b which are continuously formed within inner cam shaft 6, and which are connected with groove 36a; a radial hole 36c formed on the tip end side of axial hole 36a; an annular groove 36d formed on the inner circumference surface of second mounting hole 19f of first rotor 19, and connected with radial hole 36a; and three retard side oil holes 36e which is formed within first rotor 19 in the radial directions, and which connects annular groove 36d and retard fluid pressure chambers 12.

Similarly, as shown in FIG. 4, advance side passage 37 includes a groove 37a formed on the outer circumference surface of outer cam shaft 5; a radial hole and an axial hole 37b which are continuously formed within inner cam shaft 6, and which are connected with groove 37a; and a radial hole 37c formed on the tip end side of axial hole 37b; a connection hole 37d formed at the tip end portion of outer cam shaft 5 in the radial direction, and connected with radial hole 37c; an annular groove 37e formed on the inner circumference surface of first mounting hole 19e of first rotor 19, and connected with connection hole 37d; and three advance side holes 37f which are formed within first rotor 19 in the radial directions, and which connect annular groove 37e and advance fluid pressure chambers 13.

In electromagnetic switching valve 38, a spool valve within electromagnetic switching valve 38 is moved in an axial direction by an output and a shut-off of a control current from a control unit (ECU) (not shown) to an electromagnetic coil. With this, electromagnetic switching valve 38 is arranged to control to switch selectively discharge passage 39a of oil pump 39 and drain passage 40 with respect to retard side passage 36 and advance side passage 37. That is, when the control unit outputs the control current, electromagnetic switching valve 38 connects discharge passage 39a and retard side passage 36, and concurrently connects drain passage 40 and advance side passage 37. On the other hand, when the control unit shuts off the control current, electromagnetic switching valve 38 connects discharge passage 39a and advance side passage 37, and concurrently connects drain passage 40 and retard side passage 36.

An internal computer of the control unit senses a current driving state of the engine by receiving information signals from various sensors such as a crank angle sensor, an air flow meter, a water temperature sensor, and a throttle valve opening degree sensor (not shown). The control unit outputs the control current to the electromagnetic coil of electromagnetic switching valve 38 in accordance with this driving state of the engine.

Figure 8:
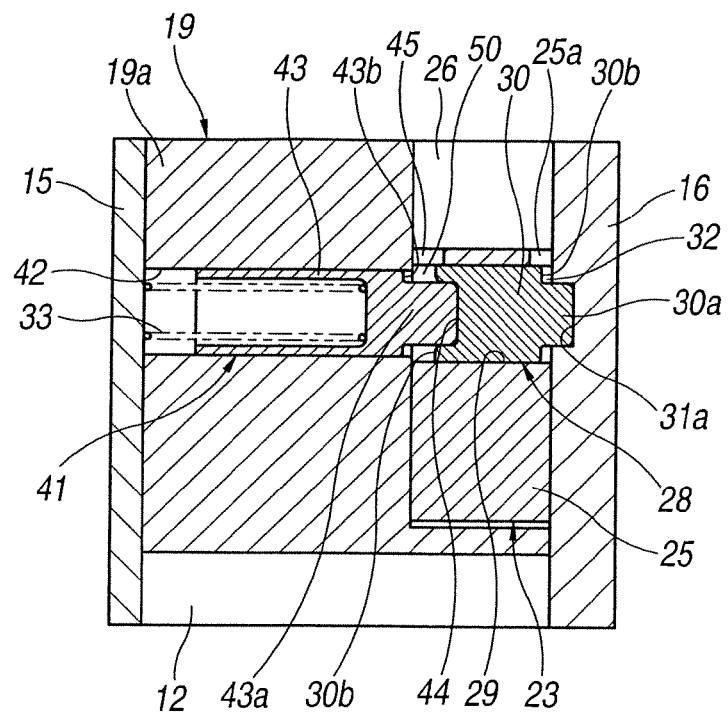
FIG. 8 is a sectional developed view showing a first lock mechanism and a second lock mechanism in the variable valve actuating apparatus of FIG. 1.

As shown in FIG. 1, FIG. 3, and FIG. 8, first lock mechanism 28 includes a sliding hole 29 formed in fourth vane 25 of second vane rotor 23; first lock pin 30 slidably received within sliding hole 29, and arranged to be moved toward and away from (into and out of) rear plate 16 (in the forward direction and in the rearward direction with respect to rear plate 16); and two first lock holes 31a and 31b which are formed in rear plate 16, and with which a tip end portion 30a of first lock pin 30 is engaged to lock second vane rotor 23; and a first engagement/release mechanism arranged to engage tip end portion 30a of first lock pin 30 with lock holes 31a and 31b in accordance with the driving state of the engine, and to release the engagement of tip end portion 30a of first lock pin 30 with lock holes 31a and 31b in accordance with the driving state of the engine.

First sliding hole 29 has a uniform inside diameter which is relatively large. First sliding hole 29 penetrates through second vane rotor 23 (fourth vane 25) in the axial direction.

First lock pin 30 includes a rear end portion having an outer circumference surface having a substantially uniform outside diameter to correspond to first sliding hole 29; and a tip end portion 30a having a small diameter slightly smaller than an inside diameter of first lock holes 31a and 31b. Moreover, first lock pin 30 includes a stepped pressure receiving surface 30b which has a stepped shape, and which is formed between the rear end portion and tip end portion 30a. Furthermore, there is formed an annular first pressure receiving chamber 32 between pressure receiving surface 30b and a first oil groove 25a formed by cutting an edge of a tip end of first sliding hole 29.

Each of first lock holes 31a and 31b has a bottomed cylindrical shape. As described above, first lock holes 31a and 31b are formed on the inside surface of rear plate 16 on the inner circumference side at a predetermined interval in the circumferential direction.

One lock hole 31a is formed at a position at which first lock pin 30 is engaged with lock hole 31a from the axial direction when second vane rotor 23 is relatively rotated on the most advance angle side. The other lock hole 31b is formed at a position at which first lock pin 30 is engaged with lock hole 31b from the axial direction when second vane rotor 23 is relatively rotated on the most retard angle side.

Accordingly, when first lock pin 30 is engaged with the one first lock hole 31a, the relative rotational angle between housing 8 and second vane rotor 23 becomes a shift conversion angle (phase) of the most advance angle which is optimal for the start of the engine. When first lock pin 30 is engaged with the other first lock hole 31b, the relative rotational angle between housing 8 and second vane rotor 23 becomes a shift angle (phase) of the most retard angle.

First lock pin 30 has an outside diameter larger than an inside diameter of second sliding hole 42 described later. Accordingly, when first lock pin 30 is moved in the rearward direction (the leftward direction in FIG. 8), a rear end outer circumference edge 30b of first lock pin 30 is abutted on the edge of second sliding hole 42, so that the maximum rearward movement of first lock pin 30 is restricted. At this time, tip end portion 30a of first lock pin 30 is fully moved out of first lock holes 31a and 31b.

The first engagement and release mechanism shares a part of an engagement and release mechanism of second lock mechanism 41. The first engagement and release mechanism includes a coil spring 33 elastically mounted (disposed) between a rear end portion of second lock pin 43 described later and the inner end surface of front plate 15, and arranged to urge first lock pin 30 through second lock pin 43 in the forward direction (in the direction toward first lock hole 31a and 31b); and a first release hydraulic pressure circuit 34 arranged to supply the hydraulic pressure to first pressure receiving surface 30b and first lock holes 31a and 31b through first pressure receiving chamber 32, and thereby to move first lock pin 30 out of first lock holes 31a and 31b to release the lock.

As shown in FIG. 1, FIG. 4, and FIG. 8, first release hydraulic pressure circuit 34 is constituted independently of hydraulic pressure circuit 4. First release hydraulic pressure circuit 34 includes a first release passage 35 which is a first lock passage connected with first lock holes 31a and 31b; and a first electromagnetic switching valve (first solenoid valve) 46 arranged to connect selectively discharge passage 39a of oil pump 39 and drain passage 40 to release passage 35.

First release passage 35 includes a first end portion arranged to be connected with oil pump 39 and drain passage 40 through first electromagnetic switching valve 46; and a second end portion. The second end portion of first release passage 35 includes a groove 35a and a radial hole which are formed in an outer circumference surface of outer cam shaft 5; an axial hole 35b which is formed within inner cam shaft 6 in the axial direction, and which is connected with the radial hole; and a connection hole 35c which is formed at the tip end portion of outer cam shaft 5, which penetrates through outer cam shaft 5 in the radial direction, and which is arranged to connect axial hole 35b and first pressure receiving chamber 32 (first lock holes 31a and 31b).

First electromagnetic switching valve 46 is controlled by an ON-OFF control signal from the control unit configured to control electromagnetic switching valve 38. First electromagnetic switching valve 46 is arranged to control to switch discharge passage 39a and drain passage 40 to first release passage 35.

As shown in FIG. 1, FIG. 4, and FIG. 8, second lock mechanism 41 includes second sliding hole 42 formed in first rotor 19 of first vane rotor 10 in the axial direction; second lock pin 43 slidably received in second sliding hole 42, and which is moved toward and away from (into and out of) first lock pin 30; a second lock hole 44 which is formed in the rear end portion of first lock pin 30, and with which a tip end portion 43a of second lock pin 43 is engaged to connect first vane rotor 10 and second vane rotor 23; and a second engagement and release mechanism arranged to engage tip end portion 43a of second lock pin 43 with second lock hole 44 in accordance with the driving state of the engine, and to release the engagement of tip end portion 43a of second lock pin 43 and second lock hole 41 in accordance with the driving state of the engine.

Second sliding hole 42 is arranged in series with (aligned with) first sliding hole 29 when first vane rotor 10 and second vane rotor 23 are in a predetermined relative rotational position. Second sliding hole 42 has a uniform inside diameter which is slightly smaller than an inside diameter of first sliding hole 29. Second sliding hole 42 penetrates through first rotor 19 in the axial direction.

Second lock pin 43 includes a rear end portion having an outer circumference surface having a substantially uniform outside diameter which corresponds to second sliding hole 42, and which is smaller than the outside diameter of first lock pin 30. Moreover, second lock pin 43 includes tip end portion 43a which has a small diameter slightly smaller than the inside diameter of second lock hole 44. Furthermore, second lock pin 43 includes a stepped second pressure receiving surface 43b which has a stepped shape, and which is located between the rear end portion and tip end portion 43a of second lock pin 43. In this way, first lock pin 30 and second lock pin 43, and first lock holes 31a and 31b and second lock hole 44 are disposed in series in the axial direction, so that a project area (projected area) of first lock pin 30 and second lock pin 43, and first lock holes 31a and 31b and second lock hole 44 are overlapped.

Moreover, a second oil groove 45 is formed by cutting the edge of the rear end portion of first sliding hole 29. Furthermore, a second pressure receiving chamber 50 is formed between second oil groove 45 and second pressure receiving surface 43b. Second oil groove 45 is connected with a second release passage 48 described later.

Second lock hole 44 is formed into a bottomed cylindrical shape. When tip end portion 43a of second lock pin 43 is engaged (locked) with second lock hole 44, first lock pin 30 and second lock pin 43 are disposed in series with each other, so that first vane rotor 10 and second vane rotor 23 are connected with each other.

As described above, the second engagement and release mechanism includes coil spring 33 which is an elastic member that is elastically disposed between the rear end portion of second lock pin 43 and the inner end surface of front plate 15, and that is arranged to urge second lock pin 43 in the forward direction (in the direction toward second lock hole 44); and a second release hydraulic pressure circuit 47 arranged to supply the hydraulic pressure through second pressure receiving chamber 50 to second pressure receiving surface 43b and second lock hole 44, and thereby to move second lock pin 43 away from (out of) second lock hole 44 to release the lock.

As shown in FIG. 1, FIG. 4, and FIG. 8, second release hydraulic pressure circuit 47 is constituted independently of hydraulic pressure circuit 4 and first release hydraulic pressure circuit 34. Second hydraulic pressure circuit 47 includes second release passage 48 which is a second lock passage connected through second to oil groove 45 to second pressure receiving chamber 50; and a second electromagnetic switching valve (solenoid valve) 49 arranged to connect selectively discharge passage 39*a* of oil pump 39 and drain passage 40 to second release passage 48.

Second release passage 48 includes a first end portion arranged to be connected through second electromagnetic switching valve 49 to discharge passage 39*a* and drain passage 40; and a second end portion. The second end portion of second release passage 48 includes a groove 48*a* and a radial hole which are formed in the outer circumference surface of outer cam shaft 5; an axial hole 48*b* formed within inner cam shaft 6 in the axial direction, and connected to the radial hole; and a connection hole 48*c* which is formed at the tip end portion of outer cam shaft 5, which penetrates through outer cam shaft 5 in the radial direction, and which is arranged to connect axial hole 48*b* and second pressure receiving chamber 50 (second lock hole 44).

Second electromagnetic switching valve 49 is controlled by an ON-OFF control signal from the control unit. Second electromagnetic switching valve 49 is arranged to switch discharge passage 39*a* and drain passage 40 with respect to second release passage 48.

[Function of First Embodiment]

First, at the start of the engine, as shown in FIG. 5 and FIG. 8, tip end portion 30*a* of first lock pin 30 is previously engaged with first lock hole 31*a* on the advance angle side by the spring force of coil spring 33, and tip end portion 43*a* of second lock pin 43 is engaged with second lock hole 44. With this, first lock pin 30 and second lock pin 43 are connected with each other in series state. Accordingly, first vane rotor 10 and second vane rotor 23 are locked at the relative rotational position on the advance angle side which is optimal for the start of the engine, relative to sprocket 1.

Figure 12:
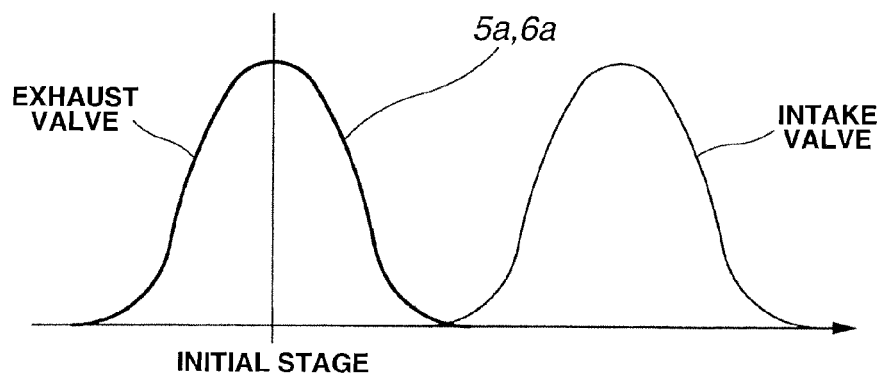
FIG. 12 is a view showing a lift characteristic when the both of the exhaust valves are controlled to the same phase on the advance angle side in the variable valve actuating apparatus of FIG. 1.

Accordingly, as shown in FIG. 2A, two drive cams 5*a* and 6*a* become the same rotational phase through outer cam shaft 5 and inner cam shaft 6. The opening and closing timing characteristic of one of the exhaust valves is held to the phase on the advance angle side at the initial stage (at the beginning), as shown by a bold solid line of FIG. 12.

Accordingly, when the engine is started by switching the ignition switch to the ON state from this state, it is possible to obtain the good start performance (the good startability) by the smooth cranking.

Then, in a predetermined driving region after the start of the engine, the control unit outputs the control current to electromagnetic switching valve 38 and first electromagnetic switching valve 46. First, discharge passage 39*a* and first release passage 35 are connected with each other. The hydraulic fluid discharged from oil pump 39 is supplied through first release passage 35 into first pressure receiving chamber 32, so that first pressure receiving chamber 32 becomes the high pressure. With this, first lock pin 30 and also second lock pin 43 are moved in the rearward direction (leftward direction in FIG. 10) by the high hydraulic pressure acted to first pressure receiving surface 30*b*, against the spring force of coil spring 33. First lock pin 30 is moved out of the one first lock hole 31*a*, so that the lock between rear plate 16 (housing 8) and second vane rotor 23 is released. At this time, second vane rotor 23 and first vane rotor 10 are maintained in the connection state (the lock state). Accordingly, the lock between housing 8, and the unit of second vane rotor 23 and first vane rotor 10 are released (second vane rotor 23 and first vane rotor 10 are released together from the lock with housing 8), so as to ensure the free relative rotation.

At the same time, discharge passage 39*a* and retard side passage 36 are connected with each other, and moreover advance side passage 37 and drain passage 40 are connected with each other. Accordingly, the hydraulic pressure discharged from oil pump 39 is supplied through retard side passage 36 into retard fluid pressure chambers 12, so that retard fluid pressure chambers 12 become the high pressure. On the other hand, the hydraulic pressure within advance fluid pressure chambers 13 is drained (discharged) to the oil pan, so that advance fluid pressure chambers 13 become the low pressure.

Figure 13:
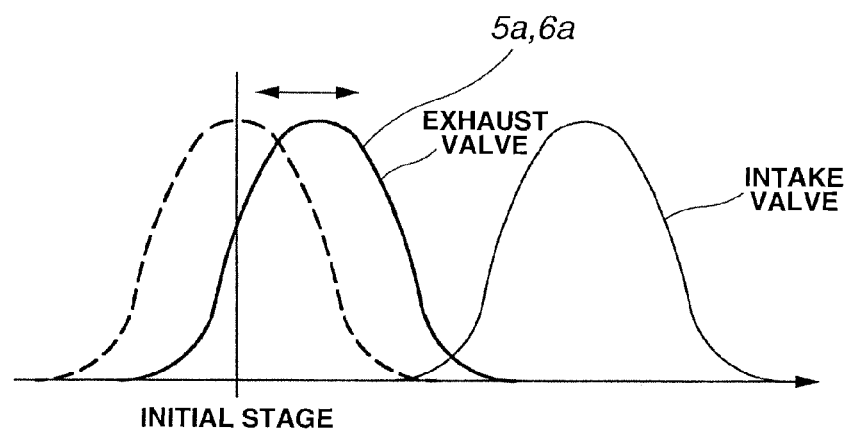
FIG. 13 is a view showing a lift characteristic when the both of the exhaust valves are controlled to the same phase on the retard angle side in the variable valve actuating apparatus of FIG. 1.

Accordingly, as shown in FIG. 6, first vane rotor 10 and second vane rotor 23 are rotated on the retard angle side relative to housing 8 in accordance with the pressure increase of retard fluid pressure chambers 12. With this, outer cam shaft 5 and also inner cam shaft 6 are synchronously rotated on the retard angle side in the counterclockwise direction. First drive cam 5*a* and second drive cam 6*a* become the same rotational phase. The opening and closing timing of one of the exhaust valves is controlled to the retard angle side, so that the opening and closing timing characteristic of the one of the exhaust valves is shifted to the phase on the most retard angle side, as shown by a bold solid line in FIG. 13.

Figure 9:
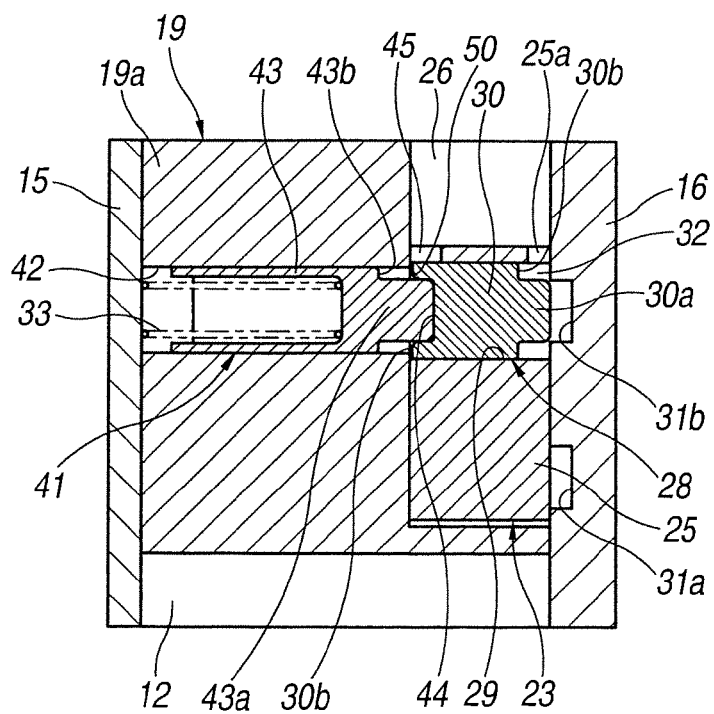
FIG. 9 is a developed cutaway view showing a state in which a first lock pin is moved out of a first lock hole in the variable valve actuating apparatus of FIG. 1.

At this time, the control unit does not output the control current to second electromagnetic switching valve 49. Accordingly, second release passage 48 and drain passage 40 are connected with each other. Consequently, as shown in FIG. 9, the lock state between first vane rotor 10 and second vane rotor 23 is continued since second lock pin 43 is continued to be engaged with second lock hole 44.

When the driving state of the engine is further varied, the control current from the control unit to electromagnetic switching valve 38 and first electromagnetic switching valve 46 is shut off. Moreover, the control current is outputted to second electromagnetic switching valve 49. Accordingly, drain passage 40 and first release passage 35 are connected with each other, so that first pressure receiving chamber 32 (the other first lock hole 31*b*) becomes the low pressure. On the other hand, discharge passage 39*a* and second release passage 48 are connected with each other. With this, the hydraulic pressure discharged from oil pump 39 is supplied through second release passage 48 to second pressure receiving chamber 50 (second lock hole 44), so that second pressure receiving chamber 50 becomes the high pressure.

Figure 10:
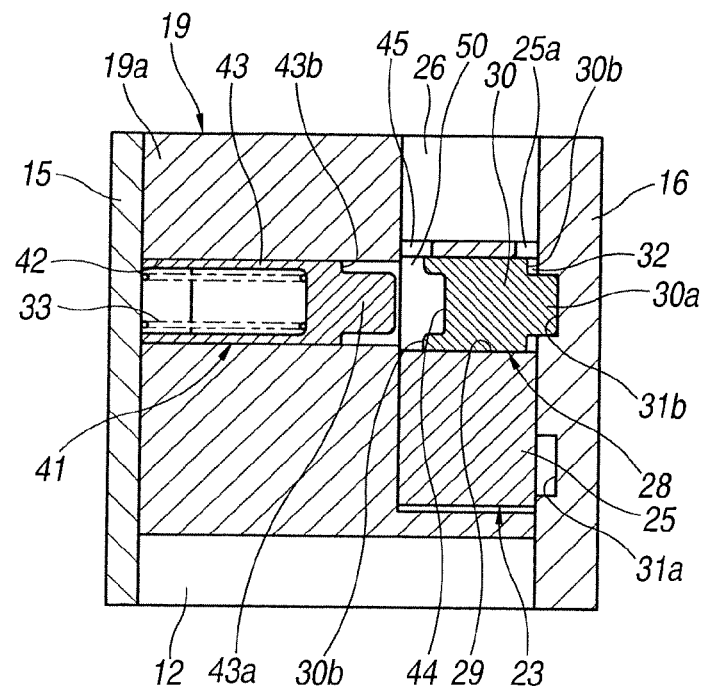
FIG. 10 is a sectional developed view showing a state in which a second lock pin is moved out of the second lock hole, and the first lock pin is engaged with the first lock hole in the variable valve actuating apparatus of FIG. 1.

Accordingly, as shown in FIG. 10, first lock pin 30 is moved in the forward direction (the rightward direction in FIG. 10) in accordance with the pressure increase of second lock hole 44, and engaged with the other first lock hole 31*b*. Concurrently, second lock pin 43 is moved in the rearward direction (the leftward direction in FIG. 10) against the spring force of coil spring 33, and moved out of second lock hole 44, so that the lock (the connection) between first vane rotor 10 and second vane rotor 23 is released. With this, second vane rotor 23 is locked with rear plate 16 (housing 8), and held at the relative rotational position on the retard angle side. On the other hand, the free relative rotation of first vane rotor 10 is allowed.

At this time, discharge passage 39*a* and advance side passage 37 are connected with each other, and retard side passage 36 and drain passage 40 are connected with each other. Accordingly, the discharge hydraulic pressure of oil pump 39 is supplied to advance fluid pressure chambers 13, so that advance fluid pressure chambers 13 become the high pressure. On the other hand, the hydraulic fluid within retard fluid pressure chambers 12 are drained (discharged) through drain passage 40 to the oil pan, so that retard fluid pressure chambers 12 become the high pressure.

Figure 7:
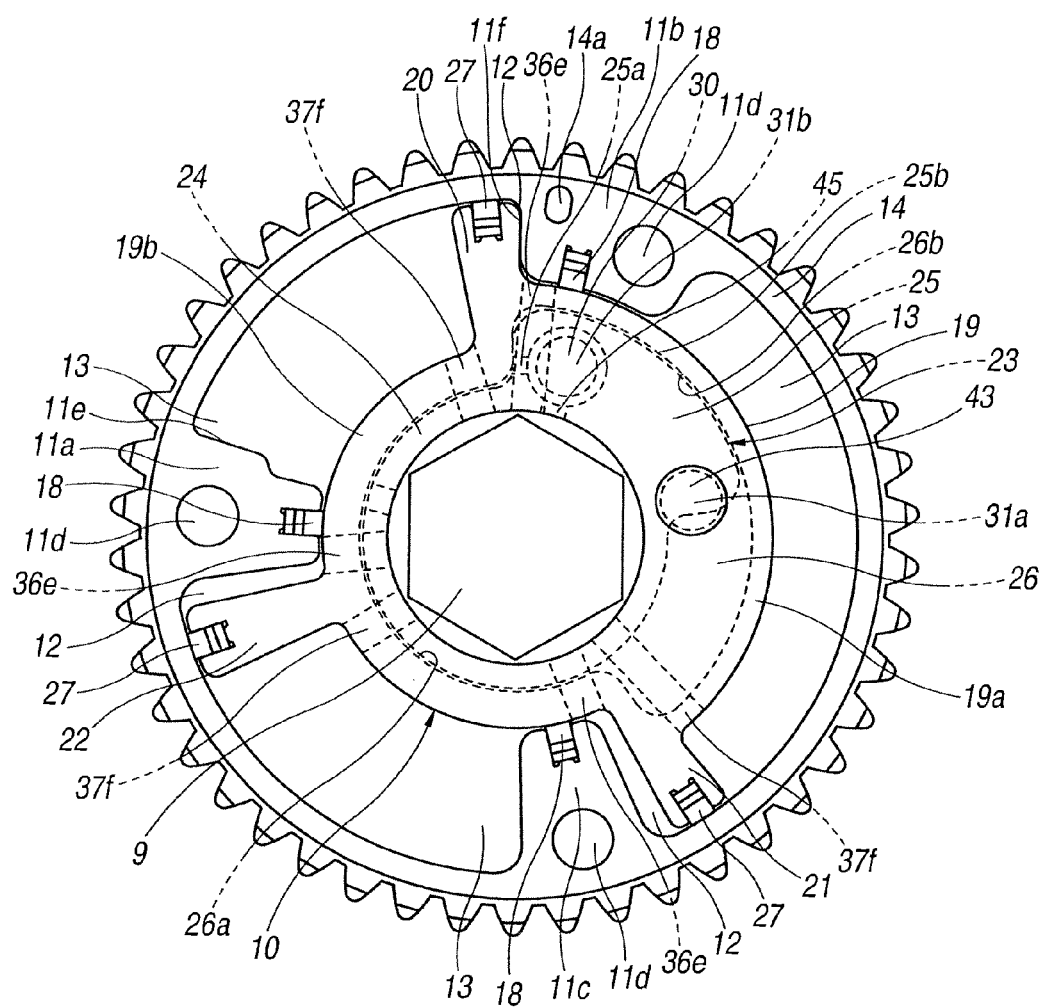
FIG. 7 is an operation illustrative view showing a state in which the second vane rotor is shifted to the most retard angle side in a state in which the first vane rotor is relatively rotated on the most retard angle side.
Figure 11:
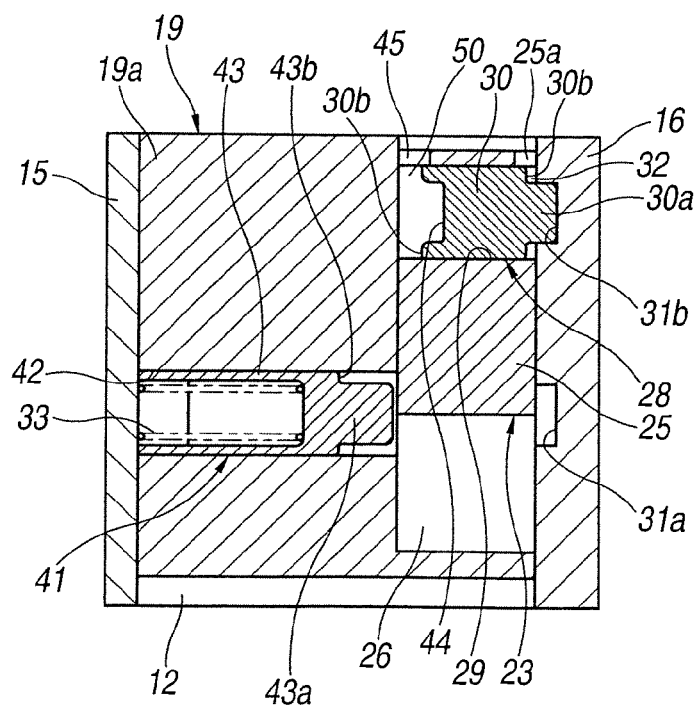
FIG. 11 is a sectional developed view showing a state in which the engagements of the first lock pin and the second lock pin are released, and the first lock pin is engaged another first lock hole in the variable valve actuating apparatus of FIG. 1.

Accordingly, as shown in FIG. 7 and FIG. 11, the only first vane rotor 10 is rotated on the advance angle side relative to housing 8. The relative rotation of second vane rotor 23 on the advance angle side is restricted, and second vane rotor 23 is held at the relative rotational position on the most retard angle side.

Consequently, first drive cam 5*a* of outer cam shaft 5 is held at the rotational position on the retard angle side. As shown in FIG. 2B, second drive cam 6*a* of inner cam shaft 6 controls the opening and closing timing of one of the exhaust valves to the rotational position on the advance angle side, similarly to a case of the start of the engine. Therefore, first drive cam 5*a* of outer cam shaft 5 becomes an open angle state in which first drive cam 5*a* of outer cam shaft 5 is opened with respect to second drive cam 6*a* of inner cam shaft 6.

Figure 14:
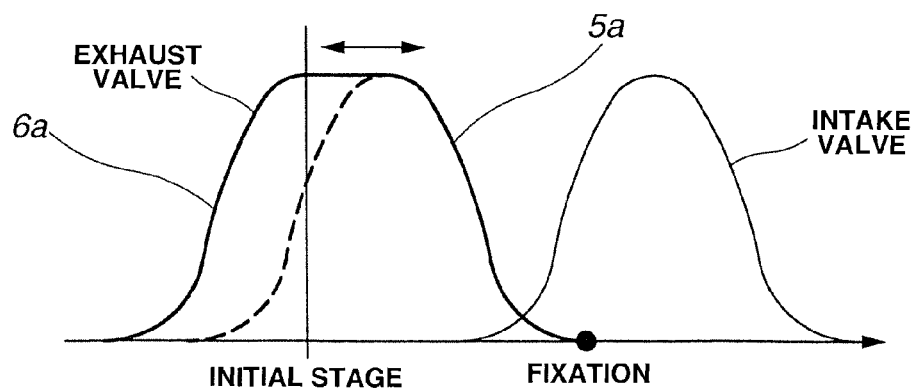
FIG. 14 is a view showing a lift characteristic when the only one of the exhaust valves is shifted to the advance angle side in the variable valve actuating apparatus of FIG. 1.

Accordingly, as shown in FIG. 14, in the opening and closing timing characteristic of the one of the exhaust valves, two drive cams 5*a* and 6*a* press the valve lifter during a time period longer than the time period during which drive cams 5*a* and 6*a* press the valve lifter at the initial phase. That is, a time period during which the one of the exhaust valves is opened becomes longer, the scavenging time period of the combustion gas is continuously increased.

The control unit performs the energization control to electromagnetic switching valve 38 and first and second electromagnetic switching valves 46 and 49 in accordance with the various variation of the driving state of the engine, and stop of the engine. With this, it is possible to arbitrarily shift the relative rotational positions of first vane rotor 10 and second vane rotor 23.

With this, it is possible to arbitrarily rotate outer cam shaft 5 and inner cam shaft 6 relatively. Consequently, it is possible to shift first drive cam 5*a* and second drive cam 6*a* to the same phase on the advance angle side and the retard angle side, and moreover to arbitrarily perform the open angle control by the phase deviation.

As described above, in this embodiment, it is possible to shift the relative rotational phase of cam shafts 5 and 6 relative to housing 8 (the crank shaft) by independently or synchronously controlling the relative rotational phases of outer cam shaft 5 and inner cam shaft 6 by using hydraulic pressure circuits 4, 34, and 47, and thereby to perform the opening and closing timing control of the exhaust valve with the high accuracy.

Moreover, second vane rotor 23 is received within first rotor 19 of first vane rotor 10. Vane rotors 10 and 23 are arranged in parallel to each other. Accordingly, it is possible to sufficiently decrease the axial length of the apparatus, relative to a case in which vane rotors are arranged in series with each other. Consequently, it is possible to improve the mountability to the engine.

Moreover, first rotor 19 of first vane rotor 10 is constituted by large diameter portion 19*a* and small diameter portion 19*b* without increasing the overall shape of first rotor 19 of first vane rotor 10. Accordingly, it is possible to suppress the decrease of the volumes of retard fluid pressure chambers 12 and advance fluid pressure chambers 13 due to small diameter portion 19*b*, and thereby to increase the pressure receiving areas of vanes 20-22. Consequently, it is possible to ensure the rapid response of the relative rotation of first vane rotor 10 on the retard angle side or the advance angle side by the hydraulic fluid supplied to fluid pressure chambers 12 and 13.

Moreover, in this embodiment, first lock pin 30 and second lock pin 43 are arranged in series with each other. Furthermore, second lock hole 44 is formed in the rear end portion of first lock pin 30. The lock between first vane rotor 10 and second vane rotor 23, and the release of the lock between first vane rotor 10 and second vane rotor 23 are performed by the hydraulic pressure supplied to and drained from the second lock hole 44. Therefore, it is possible to simplify the overall structure of the apparatus, and to effectively use the space.

That is, in a case where first lock holes 31 and second lock hole 44 are formed in different members such as rear plate 16 and front plate 15, and lock pins 30 and 43 are moved in the opposite directions of the forward and rearward directions, the overall structure of the apparatus is complicated, and the installation (arrangement) of the hydraulic pressure circuits are complicated. However, in this embodiment, second lock hole 44 is formed by using first lock pin 30. Accordingly, it is possible to simplify the overall structure of the apparatus, and to effectively use the space. Consequently, it is possible to facilitate the manufacturing operation and the assembling operation, and to decrease the manufacturing cost and the assembling operation cost.

Second Embodiment

FIG. 15 to FIG. 21 show a variable valve actuating apparatus according to a second embodiment of the present invention. This variable valve actuating apparatus is similarly applied to one of two exhaust valves of one cylinder. The variable valve actuating apparatus according to the second embodiment is substantially identical to the apparatus according to the first embodiment in most aspects as shown by the use of the same reference numerals. Unlike the first embodiment, the other first lock hole 31*b* is omitted. Moreover, an arrangement (direction) of second vane rotor 23 with respect to first vane rotor 10 is opposite to the arrangement of second vane rotor 23 with respect to first vane rotor 10 in the variable valve actuating apparatus according to the first embodiment. However, the initial relative rotational phases of vane rotors 10 and 23 are the same.

Figure 15:
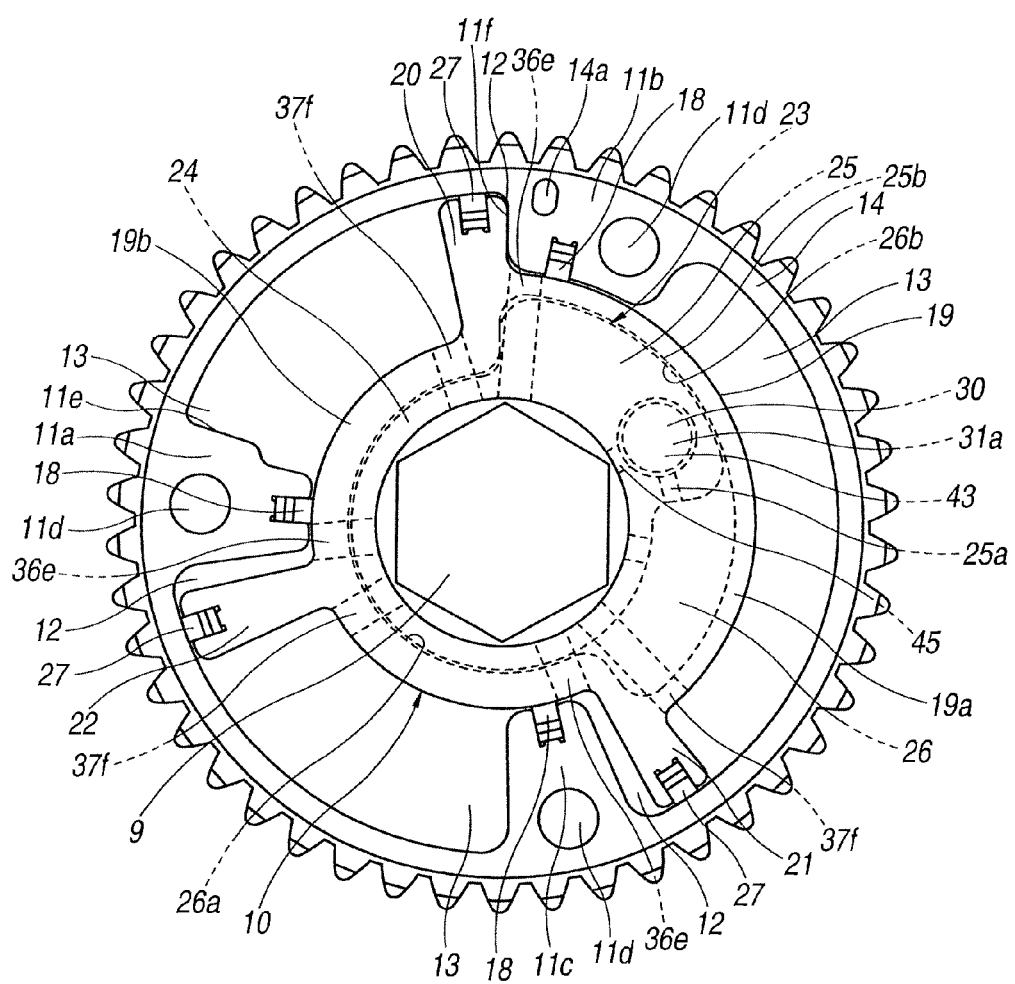
FIG. 15 is an operation illustrative view showing a state in which relative rotational phases of a first vane rotor and a second vane rotor with respect to a sprocket are shifted to a most advance angle side, in a variable valve actuating apparatus according to a second embodiment of the present invention.
Figure 18:
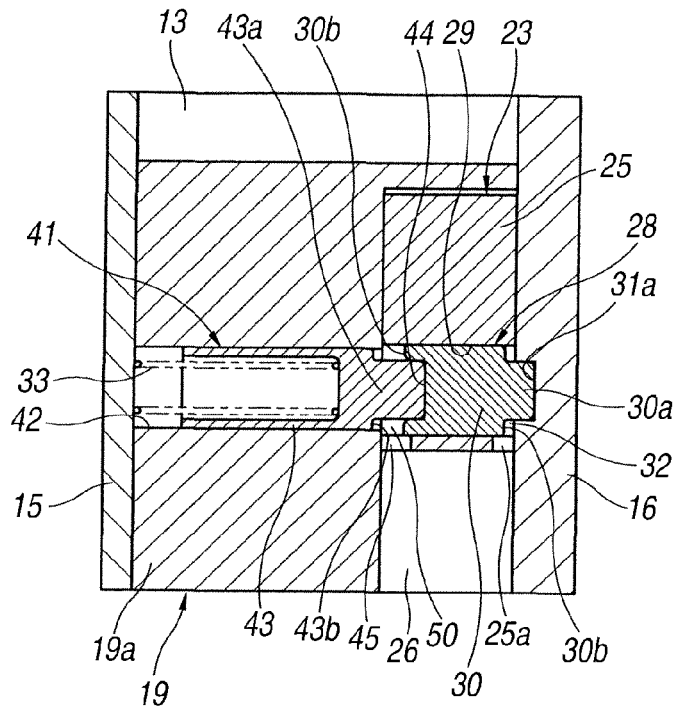
FIG. 18 is a sectional deployed view showing the first lock mechanism and the second lock mechanism in the variable valve actuating apparatus of FIG. 15.

That is, at the start of the engine, as shown in FIG. 15 and FIG. 18, tip end portion 30*a* of first lock pin 30 is previously engaged with first lock hole 31*a* on the advance angle side by the spring force of coil spring 33. Moreover, tip end portion 43*a* of second lock pin 43 is engaged with second lock hole 44. With this, first lock pin 30 and second lock pin 43 are connected in series with each other. Accordingly, first vane rotor 10 and second vane rotor 23 are locked at the relative rotational position on the advance angle side which is optimal for the start of the engine, with respect to sprocket 1.

Figure 22:
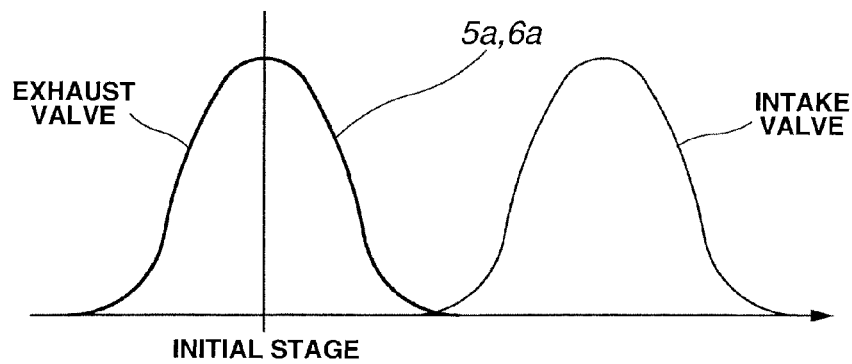
FIG. 22 is a view showing a lift characteristic when both of the exhaust valves are controlled to the same phase on the advance angle side, in the variable valve actuating apparatus of FIG. 15.

Accordingly, as shown in FIG. 2A, two drive cams 5*a* and 6*a* become the same rotational phase through outer cam shaft 5 and inner cam shaft 6. Therefore, the opening and closing timing characteristic of the one of the exhaust valves is held to the phase on the retard angle side at the initial stage, as shown by a bold solid line of FIG. 22.

Accordingly, when the engine is started from this state by switching the ignition switch to the ON state, it is possible to obtain the good start performance by the smooth cranking.

In the predetermined driving region after the start of the engine, the control unit outputs the control current to electromagnetic switching valve 38 and first electromagnetic switching valve 46. With this, discharge passage 39*a* and first release passage 35 are connected with each other. The hydraulic fluid discharged from oil pump 39 is supplied through first release passage 35 to first pressure receiving chamber 32, so that first pressure receiving chamber 32 becomes the high pressure. With this, first lock pin 30 and also second lock pin 43 are moved in the rearward direction (leftward direction in FIG. 18) by the high hydraulic pressure acted to first pressure receiving surface 30*b* against the spring force of coil spring 33, so that first lock pin 30 is moved out of the one of first lock holes 31*a*. With this, the lock between rear plate 16 (housing 8) and second vane rotor 23 is released. At this time, second vane rotor 23 and first vane rotor 10 are maintained in the connection state (the lock state). Accordingly, the lock between housing 8, and one unit of first vane rotor 10 and second vane rotor 23 are released, so as to ensure the free relative rotation between housing 8, and one unit of first vane rotor 10 and second vane rotor 23.

Concurrently, electromagnetic switching valve 38 connects discharge passage 39a and retard side passage 36, and connects advance side passage 37 and drain passage 40. Accordingly, the hydraulic pressure discharged from oil pump 39 is supplied through retard side passage 36 to retard fluid pressure chambers 12, so that retard fluid pressure chambers 12 become the high pressure. On the other hand, the hydraulic pressure within advance fluid pressure chambers 13 is drained (discharged) to the oil pan, so that advance fluid pressure chambers 13 become the low pressure.

Figure 16:
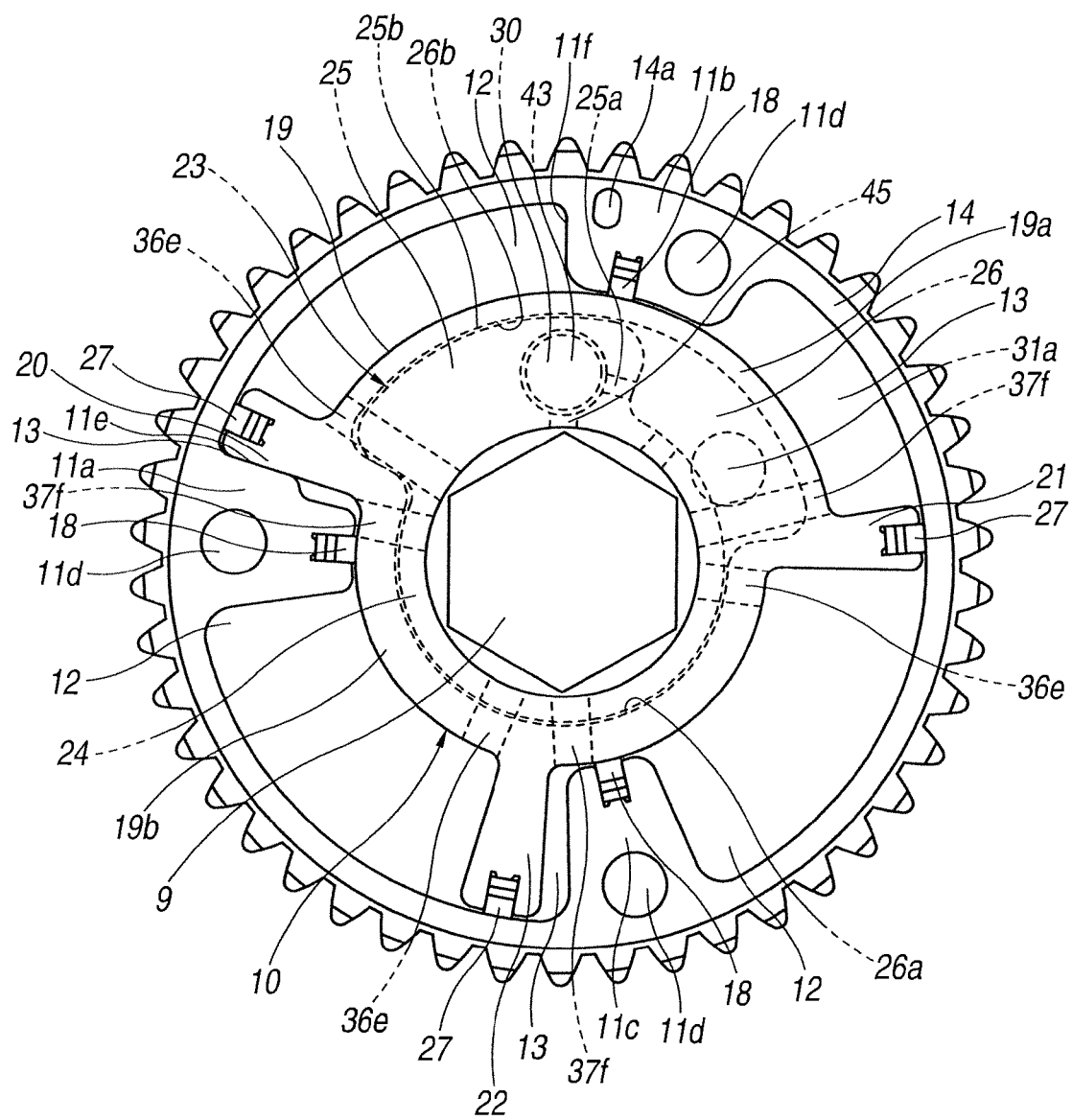
FIG. 16 is an operation illustrative view showing a state in which the first vane rotor and the second vane rotor are shifted to the most retard angle side with respect to the sprocket in the variable valve actuating apparatus of FIG. 15.
Figure 23:
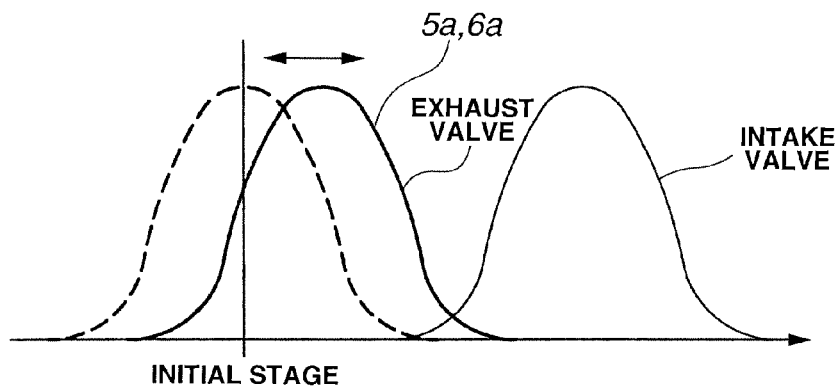
FIG. 23 is a view showing a lift characteristic when both of the exhaust valves are shifted to the same phase on the retard angle side, in the variable valve actuating apparatus of FIG. 15.

Accordingly, as shown in FIG. 16, first vane rotor 10 and second vane rotor 23 are rotated on the retard angle side relative to housing 8 in accordance with the pressure increase of retard fluid pressure chambers 13. With this, outer cam shaft 5 and inner cam shaft 6 are synchronously rotated together on the retard angle side in the counterclockwise direction, so that first drive cam 5a and second drive cam 6a become the same rotational phase. The opening and closing timing of one of the exhaust valves is controlled to the retard angle side. The opening and closing timing characteristic of the one of the exhaust valves is shifted to the phase on the most retard angle side, as shown by a bold solid line in FIG. 23.

Figure 19:
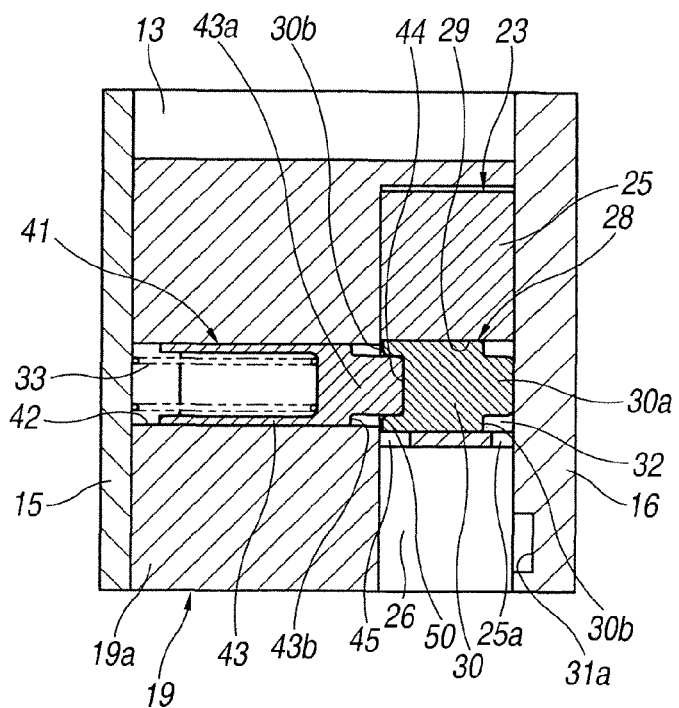
FIG. 19 is a sectional deployed view showing a state in which the first lock pin is come away from the first lock hole in the variable valve actuating apparatus of FIG. 15.

At this time, the control unit does not output the control current to second electromagnetic switching valve 49, so that second release passage 48 and drain passage 40 are connected with each other. Accordingly, as shown in FIG. 19, first vane rotor 10 is continued to be in the lock state with second vane rotor 23 since second lock pin 43 is continued to be engaged with second lock hole 44.

When the driving state of the engine is further varied, the control current from the control unit to first electromagnetic switching valve 46 is shut off. Moreover, the control current is outputted to electromagnetic switching valve 38 and second electromagnetic switching valve 49.

Accordingly, drain passage 40 and first release passage 35 are connected with each other, so that first pressure receiving chamber 32 (first lock hole 31a) becomes the low pressure. On the other hand, discharge passage 39a and second release passage 48 are connected with each other. With this, the hydraulic fluid discharged from oil pump 39 is supplied through second release passage 48 to second pressure receiving chamber 50 (second lock hole 44), so that second pressure receiving chamber 50 becomes the high pressure.

Figure 20:
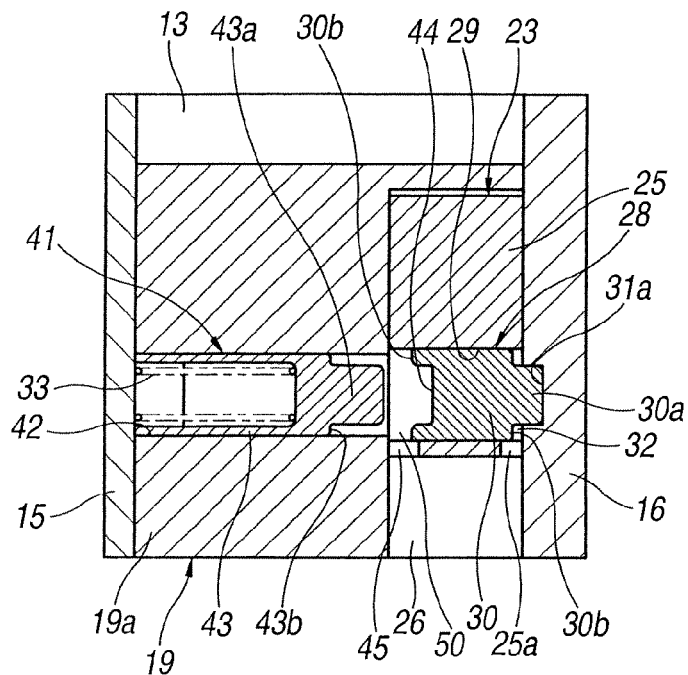
FIG. 20 is a sectional deployed view showing a state where the second lock pin is come away from the second lock hole and the first lock pin is engaged with the first lock hole in the variable valve actuating apparatus of FIG. 15.

Accordingly, as shown in FIG. 20, first lock pin 30 is moved in the forward direction (the rightward direction in FIG. 20) in accordance with the pressure increase of second lock hole 44, and engaged with first lock hole 31a. Concurrently, second lock pin 43 is moved in the rearward direction (the leftward direction) against the spring force of coil spring 33, and moved out of second lock hole 44. Consequently, the lock (the connection) between first vane rotor 10 and second vane rotor 23 is released. With this, second vane rotor 23 is locked with rear plate 16 (housing 8), and held at the relative rotational position on the advance angle side. On the other hand, the free relative rotation of first vane rotor 10 is allowed.

At this time, discharge passage 39a and retard side passage 36 are connected with each other, and moreover advance side passage 37 and drain passage 40 are connected with each other. Accordingly, the discharge hydraulic pressure of oil pump 39 is supplied to retard fluid pressure chambers 12, so that retard fluid pressure chambers 12 become the high pressure. On the other hand, the hydraulic fluid within advance fluid pressure chambers 13 is drained (discharged) through drain passage 40 to the oil pan, so that the advance fluid pressure chambers 13 are maintained in the low pressure state.

Figure 17:
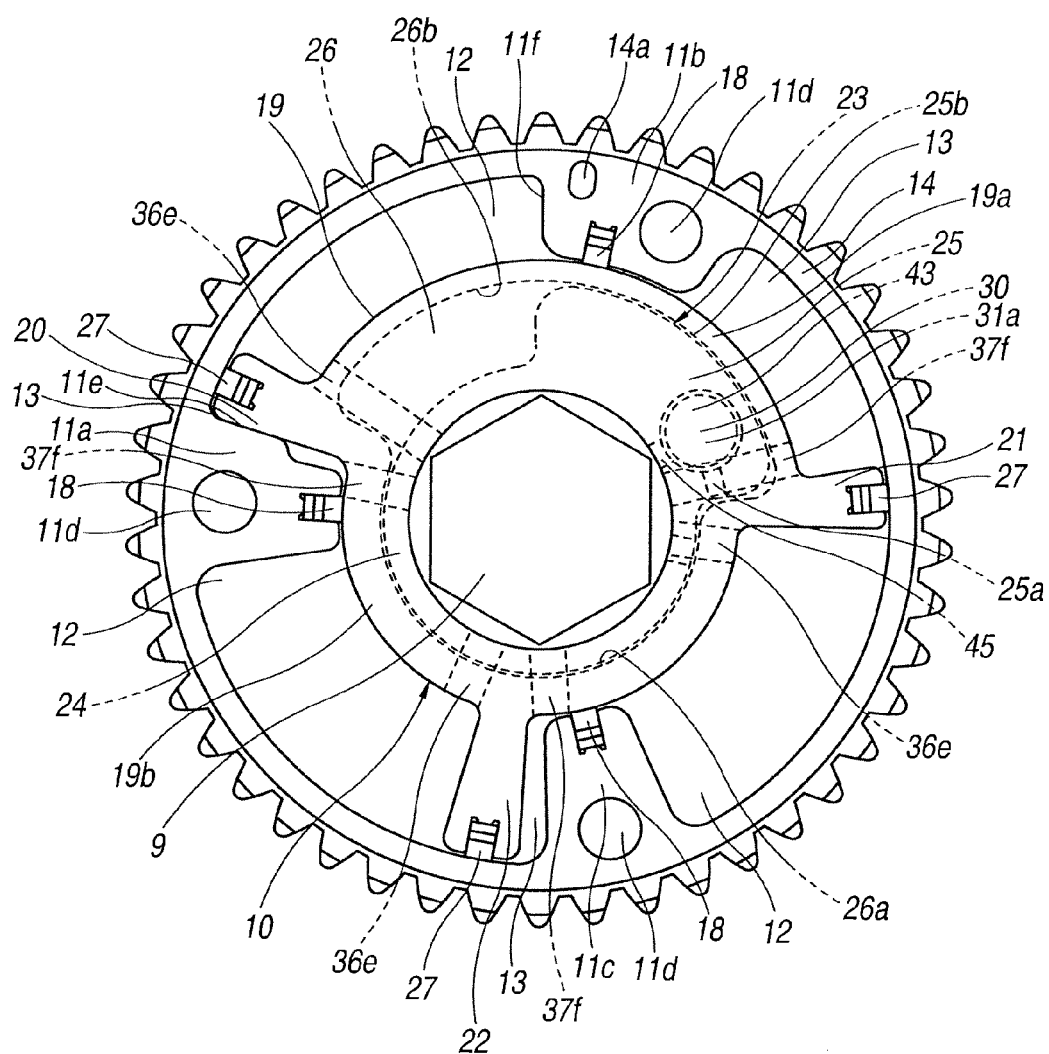
FIG. 17 is an operation illustrative view showing a state where the first vane rotor is shifted to the most retard side in a state where the second vane rotor is in the most retard angle side.
Figure 21:
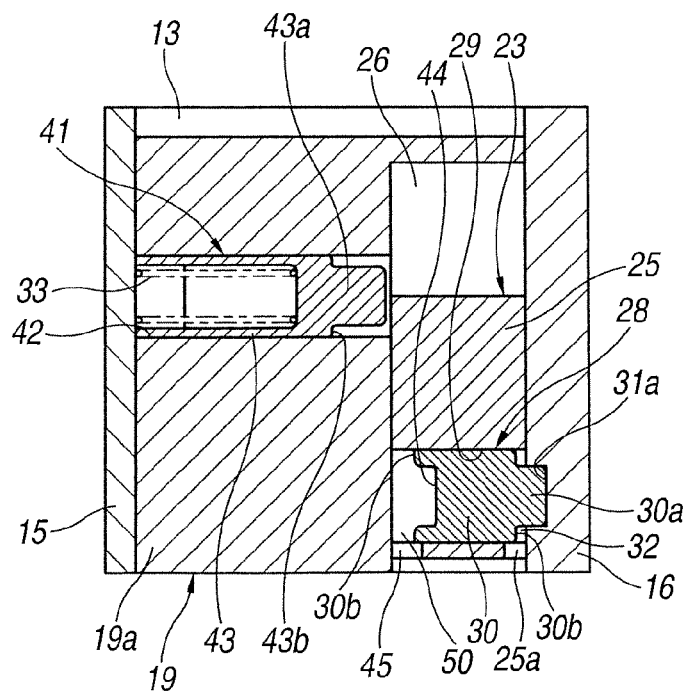
FIG. 21 is a sectional deployed view showing a state where the first lock pin is engaged with the first lock hole, and a state where the engagement of the second lock pin with the second lock hole is released and the first vane rotor is shifted to the relative rotational position on the retard angle side.

Accordingly, as shown in FIG. 17 and FIG. 21, the only first vane rotor 10 is rotated on the retard angle side relative to housing 8. The relative rotation of second vane rotor 23 on the retard angle side is restricted, and second vane rotor 23 is held at the relative rotational position on the most advance angle side.

Consequently, second drive cam 6a of inner cam shaft 6 is held at the rotational position on the advance angle side. On the other hand, first drive cam 5a of outer cam shaft 5 controls the opening and closing timing of the one of the exhaust valves to the rotational position on the retard angle side. First drive cam 5a of outer cam shaft becomes the open state in which the first drive cam 5a is opened with respect to second drive cam 6a.

Figure 24:
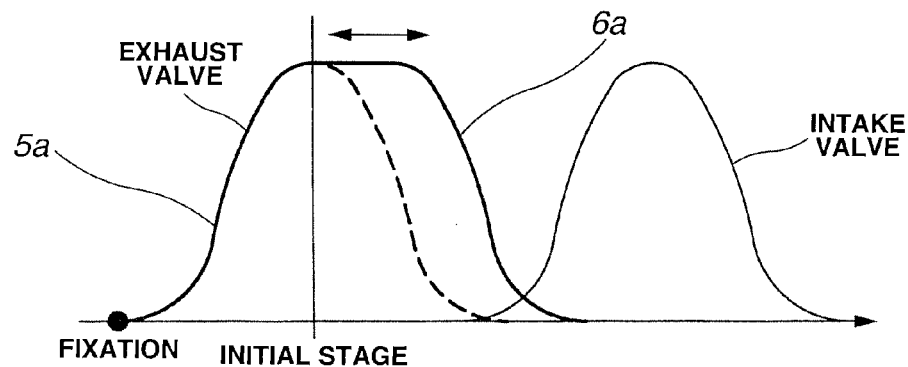
FIG. 24 is a view showing a lift characteristic when the only one of the exhaust valves is shifted to the phase on the advance angle side to become an open angle state.

Accordingly, in the opening and closing timing characteristic of one of the exhaust valves, as shown in FIG. 24, two drive cams 5a and 6a press the valve lifter during a time period longer than a time period during which two drive cams 5a and 6a press the valve lifter at the initial phase. That is, a time period during which the one of the exhaust valves is opened is increased. Accordingly, the scavenging time period of the combustion gas is continuously increased.

The control unit performs the energization control to electromagnetic switching valve 38, and first and second switching valves 46 and 49 in accordance with the various variations of the driving state of the engine, and the stop of the engine. With this, it is possible to arbitrarily shift the relative rotational positions of first vane rotor 10 and second vane rotor 23. Accordingly, it is possible to arbitrarily rotate outer cam shaft 5 and inner cam shaft 6 relatively. Moreover, it is possible to shift first drive cam 5a and second drive cam 6a to the same phase on the advance angle side and the retard angle side, and to arbitrarily perform the open angle control by the phase deviation.

As described above, in this embodiment, it is possible to shift the relative rotational phases of inner cam shaft 5 and outer cam shaft 6 relative to (with respect to) housing 8 (the crank shaft) by independently or synchronously controlling the relative rotational phases of outer cam shaft 5 and inner cam shaft 6 by using hydraulic pressure circuits 4, 34, and 47, like the first embodiment, and thereby to perform the opening and closing timing control of the exhaust valve with the high accuracy.

Moreover, second vane rotor 23 is received within first rotor 19 of first vane rotor 10. With this, first vane rotor 10 and second vane rotor 23 are arranged in parallel (to each other). Accordingly, it is possible to sufficiently decrease the axial length of the apparatus, relative to the conventional art in which vane rotors are arranged in series with each other. Consequently, it is possible to improve the mountability to the vehicle.

The other functions and the other operations are identical to those of the first embodiment.

The present invention is not limited to the above-described embodiments. It is possible to concurrently or independently control the lock between first vane rotor 10 and second vane rotor 23, and the release of the lock between first vane rotor 10 and second vane rotor 23 arbitrarily, in accordance with the driving state of the engine.

Moreover, in the embodiments, two drive cams 5a and 6a are used with respect to one of the exhaust valves. However, drive cam 5a and drive cam 6a may independently open and close, respectively, two exhaust valves of one cylinder, and moreover control to the open angle state. Moreover, the variable valve actuating apparatus according to the present invention is applicable to an intake valve, in addition to the exhaust valve.

Moreover, in the present invention, the first rotary member and the second rotary member are not limited to the vane rotor. For example, a plurality of gears may be used in place of the vane rotors.

Moreover, the lock release of the first rotary member with respect to the drive rotary member, and the lock release between the first rotary member and the second rotary member may be performed by an electric means such as an electric motor, in place of the hydraulic pressure.

[a1] In the variable valve actuating apparatus according to the embodiments of the present invention, at least one of the first lock recessed portions and the first lock member are engaged and locked with each other when the first rotary member is positioned at a relative rotational position on one of a most advance angle and a most retard angle (side) with respect to the drive rotary member, and the second rotary member is positioned at a relative rotational position on the other of the most advance angle (side) and the most retard angle with respect to the first rotary member.

[b1] In the variable valve actuating apparatus according to the embodiments of the present invention, the second rotary member constantly receives a rotational torque in the retard angle direction relative to the first rotary member at least while the drive rotary member is rotated; and at least one of the first lock recessed portions and the first lock member are locked with each other when the first rotary member is positioned at the relative rotational position on the most advance angle relative to the drive rotary member, and the second rotary member is positioned at the relative rotational position on the most retard angle relative to the first rotary member.

[c1] In the variable valve actuating apparatus according to the embodiments of the present invention, the first lock member is moved into and engaged with the other of the first lock recessed portions so as to lock the relative rotation between the drive rotary member and the second rotary member, when the first rotary member is positioned at the relative rotational position on the most advance angle relative to the drive rotary member, and the second rotary member is positioned at the relative rotational position on the most advance angle relative to the first rotary member.

[d1] In the variable valve actuating apparatus according to the embodiments of the present invention, the second lock recessed portion and the second lock member are engaged and locked with each other at a position at which the second rotary member is positioned at a relative rotational position on the most advance angle relative to the first rotary member.

[e1] In the variable valve actuating apparatus according to the embodiments of the present invention, the second lock recessed portion and the second lock member are engaged and locked with each other when the second rotary member is a relative rotational position on the most retard angle relative to the first rotary member.

[f1] In the variable valve actuating apparatus according to the embodiments of the present invention, the receiving chamber is opened on one axial side surface of the first rotary member.

[g1] In the variable valve actuating apparatus according to the embodiments of the present invention, the rotor of the first rotary member includes a large diameter portion larger than a diameter of a portion other than the large diameter portion of the rotor of the first rotary member.

[h1] In the variable valve actuating apparatus according to the embodiments of the present invention, when the internal combustion engine is stopped, the first lock member is engaged with the first lock recessed portion, and the second lock member is engaged with the second lock recessed portion.

[i1] In the variable valve actuating apparatus according to the embodiments of the present invention, the first rotary member is arranged to be rotated relative to the drive rotary member in a state where the first lock member is moved out of the first lock recessed portion to release the lock, and the second lock member is engaged with the second lock recessed portion.

[j1] In the variable valve actuating apparatus according to the embodiments of the present invention, the first rotary member is arranged to be rotated relative to the drive rotary member when the first lock member is engaged with the first lock recessed portion and the second lock member is moved out of the second recessed portion to release the lock.

[k1] In the variable valve actuating apparatus according to the embodiments of the present invention, the first lock recessed portion(s) is formed at a portion of the drive rotary member on the outer cam shaft's side and the inner cam shaft's side in the axial direction.

[l1] In the variable valve actuating apparatus according to the embodiments of the present invention, the first lock passage and the second lock passage receive a hydraulic pressure from a hydraulic pressure circuit independently from the advance angle operation chambers and the retard angle operation chambers.

[m1] In the variable valve actuating apparatus according to the embodiments of the present invention, the second lock recessed portion is formed at an end portion of the first lock member on a side opposite to the first lock recessed portion.

[n1] In the variable valve actuating apparatus according to the embodiments of the present invention, the first lock member is restricted from being moved into the second rotary member.

[o1] In the variable valve actuating apparatus according to the embodiments of the present invention, the first lock member has an outside diameter larger than an outside diameter of the second lock member.

A variable valve actuating apparatus for an internal combustion engine according to the embodiments of the present invention, the variable valve actuating apparatus includes: an inner cam shaft including an inner cam formed on an outer circumference thereof; an outer cam shaft which is provided on the outer circumference of the inner cam shaft, which includes an outer cam provided radially outside the outer cam shaft, the outer cam shaft and the inner cam shaft being arranged to be relatively rotated so as to vary a relative rotational phase of the outer cam with respect to the inner cam; a drive rotary member to which a rotational force (torque) of a crank shaft is transmitted, and which includes an operation chamber formed within the drive rotary member; a first rotary member which includes a rotor fixed to one of the inner cam shaft and the outer cam shaft, vanes separating the operation chamber into an advance angle operation chamber and a retard angle operation chamber, and a receiving chamber formed within (inside) the first rotary member, and which is arranged to be rotated toward an advance angle side or a retard angle side with respect to the drive rotary member by the hydraulic pressure selectively supplied to the advance angle operation chamber and the retard angle operation chamber; a second rotary member which is fixed to the other of the inner cam shaft and the outer cam shaft, which is rotatably received within the receiving chamber, and which is arranged to rotated within a predetermined angle range with respect to (relative to) the drive rotary member and the first rotary member; a first lock recessed portion formed on a sliding surface of the drive rotary member on which an axial end surface of the second rotary member is slid; a first lock member which is arranged to be moved in a direction of a rotational axis of the second rotary member, and which is arranged to be moved into and engaged with the first recessed portion, and thereby to lock the relative rotation between the drive rotary member and the second rotary member, and which is arranged to be moved out of the first lock recessed portion, and thereby to release the lock between the drive rotary member and the second rotary member; a second lock recessed portion formed at an end portion which is located on a side opposite to the first lock recessed portion of the first lock member; a second lock member provided to the first rotary member to be moved in an axial direction, and arranged to be moved into and engaged with the second lock recessed portion to lock the relative rotation between the first rotary member and the second rotary member, and to be moved out of the second recessed portion to release the lock between the first rotary member and the second rotary member; an urging member arranged to urge the second lock member in a direction of the second lock recessed portion (toward the second lock recessed portion); a first lock passage arranged to move the first lock member together with the second lock member engaged with the second lock recessed portion, in the rearward direction against the urging force of the urging member by supplying the hydraulic fluid, and thereby to move the first lock member (and the second lock member) out of the first lock recessed portion; and a second lock passage arranged to move the second lock member in a direction apart from the first lock member by supplying the hydraulic fluid, and to move the second lock member out of the second recessed portion.

A variable valve actuating apparatus for an internal combustion engine according to the embodiments of the present invention, the variable valve actuating apparatus includes: an inner cam shaft including an inner cam formed on an outer circumference thereof; an outer cam shaft which is provided on the outer circumference of the inner cam shaft, which includes an outer cam provided radially outside the outer cam shaft, the outer cam shaft and the inner cam shaft being arranged to be relatively rotated so as to vary a relative rotational phase of the outer cam with respect to the inner cam; a drive rotary member to which a rotational force (torque) of a crank shaft is transmitted; a first rotary member which is fixed to one of the inner cam shaft and the outer cam shaft, which is arranged to be moved toward the advance angle side or the retard angle side with respect to the drive rotary member by the hydraulic pressure, and which includes a receiving chamber formed within the first rotary member; a second rotary member which is fixed to the other of the inner cam shaft and the outer cam shaft, and which is rotatably received within the receiving chamber, and which is arranged to be rotated within a predetermined angle range with respect to (relative to) the drive rotary member and the first rotary member; a first lock recessed portion formed on a sliding surface of the drive rotary member on which an axial end surface of the second rotary member is slid; a first lock member which is arranged to be moved in a direction of a rotational axis of the second rotary member, and which is arranged to be moved into and engaged with the first recessed portion, and thereby to lock the relative rotation between the drive rotary member and the second rotary member, and which is arranged to be moved out of the first lock recessed portion, and thereby to release the lock between the drive rotary member and the second rotary member; a second lock recessed portion formed at an end portion which is located on a side opposite to the first lock recessed portion of the first lock member; a second lock member provided to the first rotary member to be moved in an axial direction, and arranged to be moved into and engaged with the second lock recessed portion to lock the relative rotation between the first rotary member and the second rotary member, and to be moved out of the second recessed portion to release the lock between the first rotary member and the second rotary member; an urging member arranged to urge the second lock member in a direction of the second lock recessed portion (toward the second lock recessed portion); a first lock passage arranged to move the first lock member together with the second lock member engaged with the second lock recessed portion, in the rearward direction against the urging force of the urging member by supplying the hydraulic fluid, and thereby to move the first lock member (and the second lock member) out of the first lock recessed portion; and a second lock passage arranged to move the second lock member in a direction apart from the first lock member by supplying the hydraulic fluid, and to move the second lock member out of the second recessed portion.

A variable valve actuating apparatus for an internal combustion engine, the variable valve actuating apparatus includes: an inner cam shaft including an inner cam formed on an outer circumference thereof; an outer cam shaft which is provided on the outer circumference of the inner cam shaft, which includes an outer cam provided radially outside the outer cam shaft, the outer cam shaft and the inner cam shaft being arranged to be relatively rotated so as to vary a relative rotational phase of the outer cam with respect to the inner cam; a drive rotary member to which a rotational force (torque) of a crank shaft is transmitted; a first rotary member which is fixed to one of the inner cam shaft and the outer cam shaft, which is arranged to be moved toward the advance angle side or the retard angle side with respect to the drive rotary member by the hydraulic pressure, and which includes a receiving chamber formed within the first rotary member; a second rotary member which is fixed to the other of the inner cam shaft and the outer cam shaft, and which is rotatably received within the receiving chamber, and which is arranged to be rotated within a predetermined angle range with respect to (relative to) the drive rotary member and the first rotary member; a first lock mechanism provided to the second rotary member, and arranged to lock a relative rotation between the drive rotary member and the second rotary member in accordance with a request, and to release the lock of the relative rotation between the drive rotary member and the second rotary member in accordance with the request; and a second lock mechanism provided to the first rotary member, and arranged to lock a relative rotation between the first rotary member and the second rotary member, and to release the lock of the relative rotation between the first rotary member and the second rotary member.

[a2] In the variable valve actuating apparatus according to the embodiments of the present invention, at least one of the first lock recessed portions and the first lock member are engaged and locked with each other when the first rotary member is positioned at the relative rotational position on one of the most advance angle side and the most retard angle side relative to the drive rotary member, and the second rotary member is positioned at the relative rotational position opposite to the relative rotational position of the first rotary member.

[b2] In the variable valve actuating apparatus according to the embodiments of the present invention, the second rotary member constantly receives a rotational torque in the retard angle direction relative to the first rotary member at least while the drive rotary member is rotated; and at least one of the first lock recessed portions and the first lock member are locked with each other when the first rotary member is positioned at the relative rotational position on the most advance angle relative to the drive rotary member, and the second rotary member is positioned at the relative rotational position on the most retard angle relative to the first rotary member.

[c2] In the variable valve actuating apparatus according to the embodiments of the present invention, when the first rotary member is positioned at the relative rotational position on the advance angle relative to the drive rotary member, and the second rotary member is positioned at the relative rotational position on the most advance angle relative to the first lock member, the first lock member is moved into and engaged with the other of the first lock recessed portions so that the relative rotation between the drive rotary member and the second rotary member is locked.

[d2] In the variable valve actuating apparatus according to the embodiments of the present invention, the second lock recessed portion and the second lock member are engaged and locked with each other at a position at which the second rotary member is positioned at the relative rotational position on the most advance angle relative to the first rotary member.

[e2] In the variable valve actuating apparatus according to the embodiments of the present invention, the second lock recessed portion and the second lock member are engaged and locked with each other at a position at which the second rotary member is positioned at the relative rotational position on the most retard angle relative to the first rotary member.

[f2] In the variable valve actuating apparatus according to the embodiments of the present invention, the receiving chamber has an opening opened on one axial side surface of the first rotary member.

[g2] In the variable valve actuating apparatus according to the embodiments of the present invention, a portion of the rotor of the first rotary member has a diameter larger than a diameter of other portion other than the portion of the rotor of the first rotary member.

[h2] In the variable valve actuating apparatus according to the embodiments of the present invention, a movement of the first lock member into the first rotary member is restricted.

[i2] In the variable valve actuating apparatus according to the embodiments of the present invention, the first lock member has an outside diameter larger than an inside diameter of the second sliding hole in which the second lock member is slid within the first rotary member.

[j2] In the variable valve actuating apparatus according to the embodiments of the present invention, the first lock member is a hollow cylindrical shape; the second lock member is a hollow cylindrical shape; and the first lock member has an outside diameter larger than an outside diameter of the second lock member.

[k2] In the variable valve actuating apparatus according to the embodiments of the present invention, the first lock member includes a small diameter portion formed at a portion at which the first lock member is engaged with the first lock recessed portion; and the second lock member includes a small diameter portion formed at a portion at which the second lock member is engaged with the second lock recessed portion.

[l2] In the variable valve actuating apparatus according to the embodiments of the present invention, the first rotary member is arranged to be rotated relative to the drive rotary member in a state where the first lock member is engaged with the first lock recessed portion, and the second lock member is not engaged with the second lock recessed portion.

[m2] In the variable valve actuating apparatus according to the embodiments of the present invention, the first rotary member is arranged to be rotated relative to the drive rotary member in a state where the first lock member is moved out of the first lock recessed portion, and the second lock member is engaged with the second lock recessed portion.

[n2] In the variable valve actuating apparatus according to the embodiments of the present invention, the first rotary member is arranged to be rotated relative to the drive rotary member in a state where the first lock member is engaged with the first lock recessed portion, and the second lock member is moved out of the second lock recessed portion.

[o2] In the variable valve actuating apparatus according to the embodiments of the present invention, the first lock recessed portion is formed in an inner end surface of the rear plate which is positioned on the drive cam's side of the outer cam shaft and the inner cam shaft in the axial direction of the drive rotary member.

[p2] In the variable valve actuating apparatus according to the embodiments of the present invention, the variable valve actuating apparatus further includes a hydraulic pressure circuit which is independent from a hydraulic pressure circuit arranged to supply and drain the hydraulic pressure to and from the advance angle operation chambers and the retard angle operation chambers, and which is arranged to supply and drain the hydraulic pressure to and from the first lock passage and the second lock passage.

The entire contents of Japanese Patent Application No. 2012-133344 filed Jun. 13, 2012 and Japanese Patent Application No. 2012-133345 filed Jun. 13, 2012 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A variable valve actuating apparatus for an internal combustion engine, the variable valve actuating apparatus comprising:
an inner cam shaft including an inner cam formed on an outer circumference thereof;
an outer cam shaft which is provided on the outer circumference of the inner cam shaft, which includes an outer cam provided radially outside the outer cam shaft, the outer cam shaft and the inner cam shaft being arranged to be relatively rotated so as to vary a relative rotational phase of the outer cam with respect to the inner cam;
a drive rotary member to which a rotational force is transmitted from a crank shaft, and which includes an operation chamber formed within the drive rotary member;
a first rotary member which includes a rotor fixed to one of the inner cam shaft and the outer cam shaft, vanes separating the operation chamber into an advance angle operation chamber and a retard angle operation chamber, and a receiving chamber formed within the first rotary member, and which is arranged to be rotated in an advance angle direction or in a retard angle direction relative to the drive rotary member by a hydraulic pressure selectively supplied to or drained from the advance angle operation chamber and the retard angle operation chamber; and
a second rotary member fixed to the other of the inner cam shaft and the outer cam shaft, rotatably received within the receiving chamber of the first rotary member, and arranged to be rotated relative to the first rotary member and the drive rotary member within a predetermined angle range;

a first lock recessed portion formed on a sliding surface of the drive rotary member on which an axial end surface of the second rotary member is slid;

a first lock member which is arranged to be moved in a direction of a rotation axis of the second rotary member, and which is arranged to be moved into and engaged with the first lock recessed portion, and thereby to lock the relative rotation between the drive rotary member and the second rotary member, and which is arranged to be moved out of the first lock recessed portion, and thereby to release the lock between the drive rotary member and the second rotary member;

a second lock recessed portion formed in a side of the second rotary member;

a second lock member provided to the first rotary member to be moved in an axial direction, and arranged to be moved into and engaged with the second lock recessed portion to lock the relative rotation between the first rotary member and the second rotary member, and to be moved out of the second recessed portion to release the lock between the first rotary member and the second rotary member;

a first lock passage arranged to supply the hydraulic fluid, and thereby to move the first lock member out of the first lock recessed portion; and a second lock passage arranged to supply the hydraulic fluid, and thereby to move the second lock member out of the second lock recessed portion, wherein at least a part of the first lock recessed portion and at least a part of the second lock recessed portion are disposed at a position to be projected in an axial direction when the first lock member and the second lock member are in the lock state.

2. The variable valve actuating apparatus as claimed in claim 1, wherein:

the variable valve actuating apparatus further includes first lock recessed portions, including the first lock recessed portion; and at least one of the first lock recessed portions and the first lock member are engaged and locked with each other when the first rotary member is positioned at a relative rotational position on one of a most advanced angle and a most retarded angle with respect to the drive rotary member, and the second rotary member is positioned at a relative rotational position on the other of the most advanced angle and the most retarded angle with respect to the first rotary member.

3. The variable valve actuating apparatus as claimed in claim 2, wherein the second rotary member constantly receives a rotational torque in the retard angle direction relative to the first rotary member at least while the drive rotary member is rotated; and at least one of the first lock recessed portions and the first lock member are locked with each other when the first rotary member is positioned at the relative rotational position on the most advanced angle relative to the drive rotary member, and the second rotary member is positioned at the relative rotational position on the most retarded angle relative to the first rotary member.

4. The variable valve actuating apparatus as claimed in claim 3, wherein the first lock member is moved into and engaged with the other of the first lock recessed portions so as to lock the relative rotation between the drive rotary member and the second rotary member, when the first rotary member is positioned at the relative rotational position on the most advanced angle relative to the drive rotary member, and the second rotary member is positioned at the relative rotational position on the most advanced angle relative to the first rotary member.

5. The variable valve actuating apparatus as claimed in claim 3, wherein the second lock recessed portion and the second lock member are engaged and locked with each other at a position at which the second rotary member is positioned at a relative rotational position on the most advanced angle relative to the first rotary member.

6. The variable valve actuating apparatus as claimed in claim 3, wherein the second lock recessed portion and the second lock member are engaged and locked with each other when the second rotary member is a relative rotational position on the most retarded angle relative to the first rotary member.

7. The variable valve actuating apparatus as claimed in claim 1, wherein the receiving chamber is opened on one axial side surface of the first rotary member.

8. The variable valve actuating apparatus as claimed in claim 7, wherein the rotor of the first rotary member includes a large diameter portion larger than a diameter of a portion other than the large diameter portion of the rotor of the first rotary member.

9. The variable valve actuating apparatus as claimed in claim 1, wherein when the internal combustion engine is stopped, the first lock member is engaged with the first lock recessed portion, and the second lock member is engaged with the second lock recessed portion.

10. The variable valve actuating apparatus as claimed in claim 1, wherein the first rotary member is arranged to be rotated relative to the drive rotary member in a state where the first lock member is moved out of the first lock recessed portion to release the lock, and the second lock member is engaged with the second lock recessed portion.

11. The variable valve actuating apparatus as claimed in claim 1, wherein the first rotary member is arranged to be rotated relative to the drive rotary member when the first lock member is engaged with the first lock recessed portion and the second lock member is moved out of the second recessed portion to release the lock.

12. The variable valve actuating apparatus as claimed in claim 1, wherein the first lock recessed portion is formed at a portion of the drive rotary member on sides of the outer cam shaft and the inner cam shaft in the axial direction.

13. The variable valve actuating apparatus as claimed in claim 1, wherein the first lock passage and the second lock passage receive a hydraulic pressure from a hydraulic pressure circuit independently from the advance angle operation chamber and the retard angle operation chamber.

14. The variable valve actuating apparatus as claimed in claim 1, wherein the second lock recessed portion is formed at an end portion of the first lock member on a side opposite to the first lock recessed portion.

15. The variable valve actuating apparatus as claimed in claim 14, wherein the first lock member is restricted from being moved into the second rotary member.

16. The variable valve actuating apparatus as claimed in claim 1, wherein the first lock member has an outside diameter larger than an outside diameter of the second lock member.

17. A variable valve actuating apparatus for an internal combustion engine, the variable valve actuating apparatus comprising:

an inner cam shaft including an inner cam formed on an outer circumference thereof;

an outer cam shaft which is provided on the outer circumference of the inner cam shaft, which includes an outer cam provided radially outside the outer cam shaft, the outer cam shaft and the inner cam shaft being arranged to be relatively rotated so as to vary a relative rotational phase of the outer cam with respect to the inner cam;

a drive rotary member to which a rotational force is transmitted from a crank shaft;

a first rotary member which is fixed to one of the inner cam shaft and the outer cam shaft, which is arranged to be rotated in an advance angle direction or in a retard angle direction relative to the drive rotary member by a hydraulic pressure, and which includes a receiving chamber formed within the first rotary member;

a second rotary member fixed to the other of the inner cam shaft and the outer cam shaft, rotatably received within the receiving chamber of the first rotary member, and arranged to be rotated relative to the first rotary member and the drive rotary member within a predetermined angle range;

a first lock recessed portion formed on a sliding surface of the drive rotary member on which an axial end surface of the second rotary member is slid;

a first lock member which is arranged to be moved in a direction of a rotation axis of the second rotary member, and which is arranged to be moved into and engaged with the first lock recessed portion, and thereby to lock the relative rotation between the drive rotary member and the second rotary member, and which is arranged to be moved out of the first lock recessed portion, and thereby to release the lock between the drive rotary member and the second rotary member;

a second lock recessed portion formed in a side of the second rotary member;

a second lock member provided to the first rotary member to be moved in an axial direction, and arranged to be moved into and engaged with the second lock recessed portion to lock the relative rotation between the first rotary member and the second rotary member, and to be moved out of the second recessed portion to release the lock between the first rotary member and the second rotary member;

a first lock passage arranged to supply the hydraulic fluid, and thereby to move the first lock member out of the first lock recessed portion; and a second lock passage arranged to supply the hydraulic fluid, and thereby to move the second lock member out of the second lock recessed portion, wherein at least a part of the first lock recessed portion and at least a part of the second lock recessed portion are disposed at a position to be projected in an axial direction when the first lock member and the second lock member are in the lock state.

18. A variable valve actuating apparatus for an internal combustion engine, the variable valve actuating apparatus comprising:

an inner cam shaft including an inner cam formed on an outer circumference thereof;

an outer cam shaft which is provided on the outer circumference of the inner cam shaft, which includes an outer cam provided radially outside the outer cam shaft, the outer cam shaft and the inner cam shaft being arranged to be relatively rotated so as to vary a relative rotational phase of the outer cam with respect to the inner cam;

a drive rotary member to which a rotational force is transmitted from a crank shaft, and which includes an operation chamber formed within the drive rotary member;

a first rotary member which includes a rotor fixed to one of the inner cam shaft and the outer cam shaft, vanes separating the operation chamber into an advance angle operation chamber and a retard angle operation chamber, and a receiving chamber formed within the first rotary member, and which is arranged to be rotated in an advance angle direction or in a retard angle direction relative to the drive rotary member by a hydraulic pressure selectively supplied to or drained from the advance angle operation chamber and the retard angle operation chamber; and a second rotary member fixed to the other of the inner cam shaft and the outer cam shaft, rotatably received within the receiving chamber of the first rotary member, and arranged to be rotated relative to the first rotary member and the drive rotary member within a predetermined angle range;

a first lock mechanism provided to the first rotary member, and arranged to lock a relative rotation between the first rotary member and the second rotary member, and to release the lock of the relative rotation between the first rotary member and the second rotary member; and a second lock mechanism provided to the second rotary member, and arranged to lock a relative rotation between the drive rotary member and the second rotary member in accordance with a request, and to release the lock of the relative rotation between the drive rotary member and the second rotary member in accordance with a request.

* * * * *